United States Patent
Gresset et al.

(10) Patent No.: US 9,439,187 B2
(45) Date of Patent: Sep. 6, 2016

(54) METHOD AND PROCESSING DEVICE FOR ALLOCATING TIME AND FREQUENCY RESOURCES FOR AT LEAST ONE DATA TRANSMISSION VIA A FAST FADING FREQUENCY SELECTIVE CHANNEL

(71) Applicant: MITSUBISHI ELECTRIC CORPORATION, Tokyo (JP)

(72) Inventors: Nicolas Gresset, Rennes (FR); Loic Brunel, Rennes (FR); Jonathan Letessier, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 2 days.

(21) Appl. No.: 14/436,042

(22) PCT Filed: Dec. 11, 2013

(86) PCT No.: PCT/JP2013/083805
§ 371 (c)(1),
(2) Date: Apr. 15, 2015

(87) PCT Pub. No.: WO2014/098102
PCT Pub. Date: Jun. 26, 2014

(65) Prior Publication Data
US 2015/0289241 A1   Oct. 8, 2015

(30) Foreign Application Priority Data
Dec. 17, 2012  (EP) .................................. 12197559

(51) Int. Cl.
*H04W 72/04* (2009.01)
*H04L 5/00* (2006.01)
(Continued)

(52) U.S. Cl.
CPC ............ *H04W 72/044* (2013.01); *H04L 5/006* (2013.01); *H04L 5/0044* (2013.01);
(Continued)

(58) Field of Classification Search
CPC ................... H04W 72/0446; H04W 72/0453; H04W 72/085; H04L 5/0005–5/0012; H04L 5/006; H04L 25/024; H04B 17/336; H04B 17/382
See application file for complete search history.

(56) References Cited

U.S. PATENT DOCUMENTS

| 2010/0034151 A1* | 2/2010 | Alexiou | H04B 7/022 370/329 |
|---|---|---|---|
| 2010/0284499 A1* | 11/2010 | Lindoff | H04L 1/20 375/346 |
| 2011/0021232 A1* | 1/2011 | Kazmi | H04L 5/0007 455/509 |

FOREIGN PATENT DOCUMENTS

| EP | 2 031 790 A1 | 3/2009 |
| WO | WO 2009/128767 A1 | 10/2009 |

OTHER PUBLICATIONS

Cheikh et al., "SAFH—Smooth Adaptive Frequency Hopping", 2011 Third International Workshop on, IEEE, XP032088206, Nov. 30, 2011, pp. 1-5.

(Continued)

*Primary Examiner* — Pao Sinkantarakorn
(74) *Attorney, Agent, or Firm* — Birch, Stewart, Kolasch & Birch, LLP

(57) ABSTRACT

For allocating time and frequency resources for at least one data transmission via a fast fading frequency selective channel between an access point of a wireless telecommunications network and at least one communication device located in at least one respective moving conveyance, a processing device: obtains long-term SINR information for a set of time and frequency resources; obtains at least one frequency correlation profile; obtains at least one time correlation profile; computes figures of merit for potential sequences of time and frequency resources, based on the obtained long-term signal-plus-interference to noise ratio information and on the obtained time and frequency correlation profiles; selects a sequence that provides a figure of merit that expects reaching a target quality of service for said data transmission(s) or that is the best figure or merit; allowing said data transmission(s) via the selected sequence.

15 Claims, 11 Drawing Sheets

Figure 1:
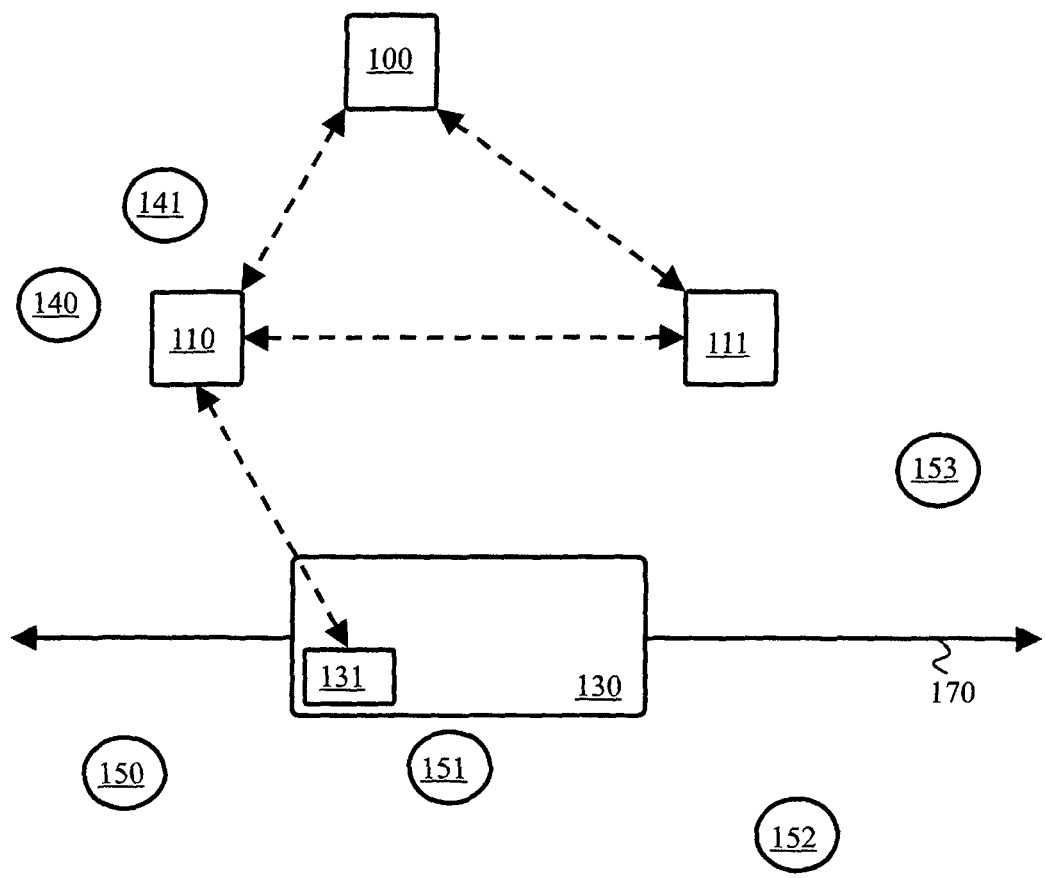

(51) Int. Cl.
  *H04L 25/02* (2006.01)
  *H04W 72/08* (2009.01)
  *H04W 24/10* (2009.01)
  *H04B 17/27* (2015.01)
  *H04B 17/336* (2015.01)

(52) U.S. Cl.
  CPC ........... *H04L 25/024* (2013.01); *H04W 24/10* (2013.01); *H04W 72/085* (2013.01); *H04B 17/27* (2015.01); *H04B 17/336* (2015.01)

(56) References Cited

OTHER PUBLICATIONS

Li et al., "Robust Channel Estimation for OFDM Systems with Rapid Dispersive Fading Channels", IEEE Transactions on Communications, vol. 46, No. 7, Jul. 1998, pp. 902-915.

Stabellini et al., "A New Probabilistic Approach for Adaptive Frequency Hopping", IEEE 20th International Symposium on Personal, Indoor and Mobile Radio Communications (PIMRC 2009), IEEE, XP031660012, Sep. 13, 2009, pp. 2147-2151.

\* cited by examiner

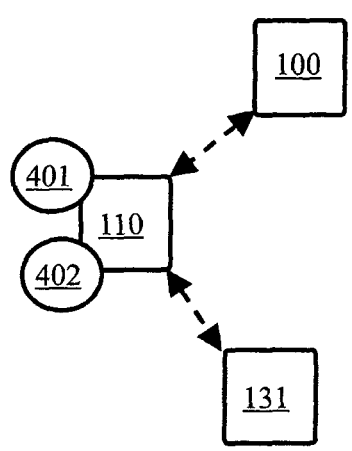
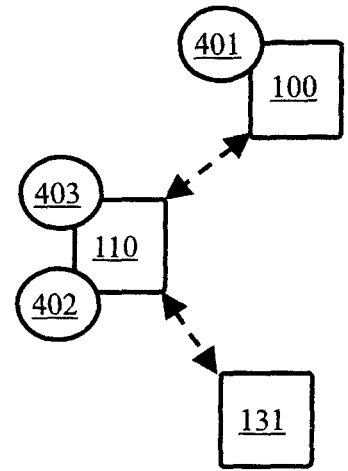
Fig. 4C             Fig. 4D
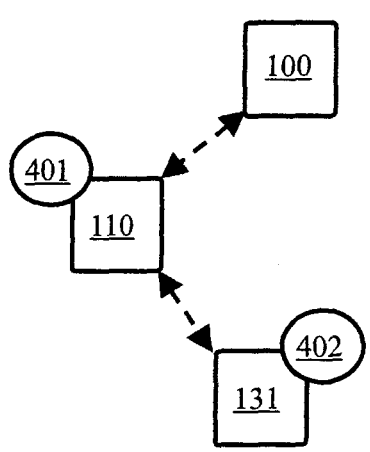
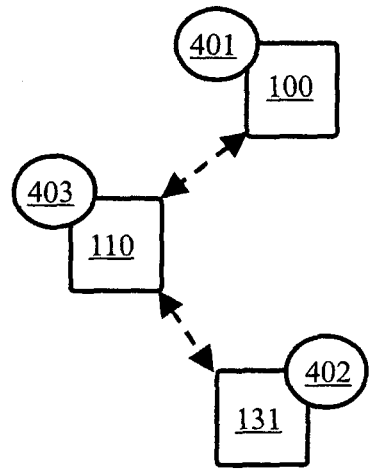
Fig. 4E             Fig. 4F

METHOD AND PROCESSING DEVICE FOR ALLOCATING TIME AND FREQUENCY RESOURCES FOR AT LEAST ONE DATA TRANSMISSION VIA A FAST FADING FREQUENCY SELECTIVE CHANNEL

The present invention generally relates to allocating time and frequency resources for a communication via a fast fading frequency selective channel between an access point of a wireless telecommunications network and at least one communication device located in at least one respective moving conveyance moving on a path.

In wireless communications, time and frequency resources are usually defined as parameters of a multiple access transmission technology that allows several devices to transmit on a same frequency channel in a same time frame, where the time domain is sequentially divided into time frames or time slots. Several multiple access technologies can be used at the same time. An interference received at a given receiver device is defined as a signal transmitted by one or several source devices to one or several other receiver devices on same time and frequency resources as the ones used by a source device for transmitting data to said given receiver device.

In a wireless telecommunications system, access points (APs) are deployed along a path over which a moving conveyance moves in order to offer wireless communications services to communication devices located in the moving conveyance. For instance, the moving conveyance is a train and the path is a railroad. The APs can be connected to a server implemented in a core network or be directly connected one with each other in order to respectively implement centralized or decentralized time and frequency resources management and/or mobility management functionalities. When the moving conveyance moves along the path, the considered communication devices located in the moving conveyance are assumed to communicate with the AP providing the most robust data link through hand-over procedures. Such communications with the APs use resources typically allocated by the APs or the aforementioned server. Usually, frequencies of the resources correspond to channels in the ISM (Industrial, Scientific and Medical) radio band, which implies that there is a high probability that other neighbouring devices also use the same time and frequency resources. Therefore, many communications may occur concurrently in unlicensed spectrum.

In order to fight against bad channel conditions, frequency hopping mechanisms are usually implemented. Indeed, transmitting data over frequency channels being sufficiently distant one from each other ensures frequency diversity and consequently improves the transmission error rate. Moreover, transmitting data on different frequency channels limits the impact of an interferer. Usually, frequency hopping sequences are defined in a pseudo-random fashion and the time and frequency resources allocation uniformly covers the whole frequency spectrum, which limits the probability of collision with other frequency hopping systems, limits interference on other systems transmitting in the ISM radio band, maximizes the frequency diversity and minimizes the probability of being interfered. Several algorithms exist for optimizing the frequency hopping sequence in order to improve robustness of the transmission. Such algorithms typically comprise making statistics on the error rate experienced for each frequency channel and avoiding channels with bad error rate in the frequency hopping sequence. One may refer to the document "*SAFH—Smooth Adaptive Frequency Hopping*", Sami Ben Cheikh et al, Third International Workshop on Cross Layer Design, 2011. The authors of this document propose performing a frame error rate prediction for each frequency channel from previous transmission attempts, and associating a selection probability with each frequency channel in order to statistically meet a target error rate. One may also refer to the document "*A New Probabilistic Approach for Adaptive Frequency Hopping*", Luca Stabellini et al, IEEE 20th International Symposium on Personal, Indoor and Mobile Radio Communications, 2009. In this document, the authors propose a similar mechanism with a slightly different method for mapping the error rate to the probability of selecting a frequency channel.

One should note that the aforementioned frequency hopping mechanisms are designed for static communication devices, and are not adapted to moving communication devices.

It is therefore desirable to provide a frequency hopping solution that allows improving the transmission error rate of at least one data transmission on a fast fading frequency selective channel between an access point of a wireless telecommunications network and at least one communication device located in at least one respective moving conveyance moving on a path.

To that end, the present invention concerns a method for allocating time and frequency resources for at least one data transmission via a fast fading frequency selective channel between an access point of a wireless telecommunications network and at least one communication device located in at least one respective moving conveyance moving on a path. The method is such that a processing device performs: obtaining long-term signal-plus-interference to noise ratio information for a set of time and frequency resources; obtaining at least one frequency correlation profile of the fast fading frequency selective channel; obtaining at least one time correlation profile of the fast fading frequency selective channel; computing figures of merit for potential sequences of time and frequency resources among the set of time and frequency resources, based on the obtained long-term signal-plus-interference to noise ratio information, on the obtained frequency correlation profile(s) and on the obtained time correlation profile(s); selecting a sequence of time and frequency resources that provides a figure of merit, among the computed figures of merit, that expects reaching a target quality of service for said data transmission(s) or that is the best figure or merit; allowing said data transmission(s) via the selected sequence of time and frequency resources. Thus, by taking into consideration signal power and interference information via the long-term signal-plus-interference to noise ratio, and the time and frequency correlation profiles, the transmission error rate of the data transmission(s) on the fast fading frequency selective channel between the access point and the communication device(s) located in the respective moving conveyance(s) is improved.

According to a particular feature, the processing device performs obtaining information representative of at least one position of the respective moving conveyance(s), and obtaining the frequency correlation profile(s) of the fast fading frequency selective channel consists in obtaining at least one frequency correlation profile(s) respectively corresponding to said position(s) of the moving conveyance(s). Thus, taking into account the frequency correlation is possible when the speed of the moving conveyance(s) is high.

According to a particular feature, the processing device performs: obtaining information representative of at least one speed of the respective moving conveyance(s); obtaining the time correlation profile(s) on the basis of said speed of the respective moving conveyance(s) and a Doppler frequency shift model. Thus, taking into account the time correlation is more accurate and the time correlation profile can be determined with limited communication overhead.

According to a particular feature, the processing device combines, into one instantaneous signal-to-interference plus noise ratio covariance matrix for each moving conveyance, the time correlation information, the frequency correlation information and the long-term signal-plus-interference to noise ratio information. Thus, the determining of the figure of merit is made easier.

According to a particular feature, each figure of merit is a result of a function to which the instantaneous signal-to-interference plus noise ratio covariance matrix is input and which represents an expected probability of success of said data transmission(s). Thus, it is possible to enhance the time and frequency resource allocation so as to guarantee a given probability of error under a latency constraint for high priority data traffic.

According to a particular feature, each figure of merit is a result of a function to which the instantaneous signal-to-interference plus noise ratio covariance matrix is input and which represents an expected throughput of said data transmission(s). Thus, it is possible to enhance the time and frequency resource allocation so as to improve the throughput for low priority data traffic.

According to a particular feature, for plural moving conveyances, the processing device determines one figure of merit per moving conveyance for each potential sequence of time and frequency resources and associates with each potential sequence the figure of merit being the minimum among the figures of merit determined for the moving conveyances and for said sequence. Thus, a time and frequency resources allocation common to transmissions implying plural moving conveyances is found, which makes a trade-off in the quality of service for all said transmissions so as to improve the performance of the worst transmission.

According to a particular feature, the processing device performs: selecting, for each time slot, said sequence of time and frequency resources that provides the figure of merit that expects reaching a target quality of service or that is the best figure or merit; storing in memory the selected sequence in association with the time slot; and, when the data transmission(s) become(s) effective, the processing device performs: retrieving from memory the sequence associated with the time slot from which the data transmission(s) become(s) effective. Thus, the time and frequency resource allocation is enhanced independently for each time slot, and determined in advance, which reduces the overall latency of the data transmission(s).

According to a particular feature, the processing device performs: detecting that the data transmission(s) shall become effective; selecting, from a time slot from which the data transmission(s) shall become effective, said sequence of time and frequency resources that provides the figure of merit that expects reaching a target quality of service or that is the best figure of merit. Thus, the time and frequency resources allocation is computed only when needed, which saves computational resources.

According to a particular feature, for selecting said sequence of time and frequency resources that provides the figure of merit that expects reaching a target quality of service or that is the best figure of merit, the processing device initialises a first temporary sequence of N time and frequency resources, N being determined to be a priori high enough for reaching the target quality of service, and the processing device further performs the following iterative steps: computing an instantaneous signal-to-interference plus noise ratio covariance matrix combining the time correlation information, the frequency correlation information and the long-term signal-plus-interference to noise ratio information and corresponding to the temporary sequence; determining a figure of merit for the temporary sequence, on the basis of the computed instantaneous signal-to-interference plus noise ratio covariance matrix; determining whether the determined figure of merit is better than a figure of merit corresponding to a second temporary sequence; replacing the second temporary sequence by the first temporary sequence, when the figure of merit of the first temporary sequence is better than the figure of merit of the second temporary sequence; selecting the second temporary sequence, when a stopping condition is met; modifying the temporary sequence by replacing one time and frequency resources and repeating said iterative steps with the modified temporary sequence, when the stopping condition is not met. Thus, the enhancement of the time and frequency resources allocation is of average complexity and can be implemented so as to provide a good result within a pre-determined relatively small amount of time. Also, by initializing the first temporary sequence with the sequence of time and frequency resources selected obtained in a preceding execution of the method, the variations of the fast fading frequency selective channel statistics are tracked (channel tracking) and the optimization tends to be optimal.

According to a particular feature, for selecting said sequence of time and frequency resources that provides the figure of merit that expects reaching a target quality of service or that is the best figure of merit, the processing device initialises a first temporary sequence of one time and frequency resources, and the processing device further performs the following iterative steps: computing an instantaneous signal-to-interference plus noise ratio covariance matrix combining the time correlation information, the frequency correlation information and the long-term signal-plus-interference to noise ratio information and corresponding to the temporary sequence; determining a figure of merit for the temporary sequence, on the basis of the computed instantaneous signal-to-interference plus noise ratio covariance matrix; determining whether the determined figure of merit is better than a figure of merit corresponding to a second temporary sequence; replacing the second temporary sequence by the first temporary sequence, when the figure of merit of the first temporary sequence is better than the figure of merit of the second temporary sequence; selecting the second temporary sequence, when a stopping condition is met; modifying the first temporary sequence by replacing one time and frequency resource, or, when all frequencies have been checked for a considered time slot of the first temporary sequence, by adding one time and frequency resource in another time slot, and repeating said iterative steps with the modified first temporary sequence, when the stopping condition is not met. Thus, the time and frequency resource allocation is of low and fixed complexity, and provides quasi-optimal performance.

According to a particular feature, the processing device performs: determining a starting time slot from which the sequence is expected to start; selecting, for said starting time slot, said sequence of time and frequency resources that provides the figure of merit that expects reaching a target quality of service or that is the best figure or merit, said sequence including time and frequency resources that have been selected in a preceding sequence selection and that are included in said starting time slot or in time slots subsequent to said starting time slot; storing in memory information representative of the selected sequence in association with said time slot and, with each time slot of the selected sequence, information representative of the time and frequency resource of said time slot which is present in said selected sequence; and, when the data transmission(s) become(s) effective, the processing device performs: retrieving from memory the information representative of the sequence associated with the time slot from which the data transmission(s) become(s) effective and, for each time slot of the retrieved sequence, the information representative of the time and frequency resource. Thus, memory usage can be enhanced for performing the time and frequency resources allocation.

According to a particular feature, for selecting said sequence of time and frequency resources that provides the figure of merit that expects reaching a target quality of service or that is the best figure of merit, the processing device initialises a first temporary sequence with said time and frequency resources from the preceding sequence selection, and the processing device further performs the following iterative steps: computing an instantaneous signal-to-interference plus noise ratio covariance matrix combining the time correlation information, the frequency correlation information and the long-term signal-plus-interference to noise ratio information and corresponding to the temporary sequence; determining a figure of merit for the temporary sequence, on the basis of the computed instantaneous signal-to-interference plus noise ratio covariance matrix; determining whether the determined figure of merit is better than a figure of merit corresponding to a second temporary sequence; replacing the second temporary sequence by the first temporary sequence, when the figure of merit of the first temporary sequence is better than the figure of merit of the second temporary sequence; selecting the second temporary sequence, when a stopping condition is met; modifying the first temporary sequence by replacing one time and frequency resource corresponding to a time slot not present in the preceding sequence selection, or, when all frequencies have been checked for a considered time slot of the first temporary sequence, by adding one time and frequency resource in another time slot, and repeating said iterative steps with the modified first temporary sequence, when the stopping condition is not met. Thus, the time and frequency resources allocation is of low and fixed complexity, and provides good performance.

According to a particular feature, when selecting a sequence of time and frequency resources, the processing device ensures that a frequency is not allocated more than a predefined percentage of time during a predefined time period. Thus, the energy radiated on a given frequency band during a given amount of time is controlled.

The present invention also concerns a processing device for allocating time and frequency resources for at least one data transmission via a fast fading frequency selective channel between an access point of a wireless telecommunications network and at least one communication device located in at least one respective moving conveyance moving on a path. The processing device comprises: means for obtaining long-term signal-plus-interference to noise ratio information for a set of time and frequency resources; means for obtaining at least one frequency correlation profile of the fast fading frequency selective channel; means for obtaining at least one time correlation profile of the fast fading frequency selective channel; means for computing figures of merit for potential sequences of time and frequency resources among the set of time and frequency resources, based on the obtained long-term signal-plus-interference to noise ratio information, on the obtained frequency correlation profile(s) and on the obtained time correlation profile(s); selecting a sequence of time and frequency resources that provides a figure of merit, among the computed figures of merit, that expects reaching a target quality of service for said data transmission(s) or that is the best figure or merit; allowing said data transmission(s) via the selected sequence of time and frequency resources.

The present invention also concerns a computer program that can be downloaded from a communication network and/or stored on a medium that can be read by a processing device. This computer program comprises instructions for causing implementation of the aforementioned method, when said program is run by the processor. The present invention also concerns information storage means, storing a computer program comprising a set of instructions causing implementation of the aforementioned method, when the stored information is read from said information storage means and run by a processor.

Since the features and advantages related to the processing device and to the computer program are identical to those already mentioned with regard to the corresponding aforementioned method, they are not repeated here.

Figure 2:
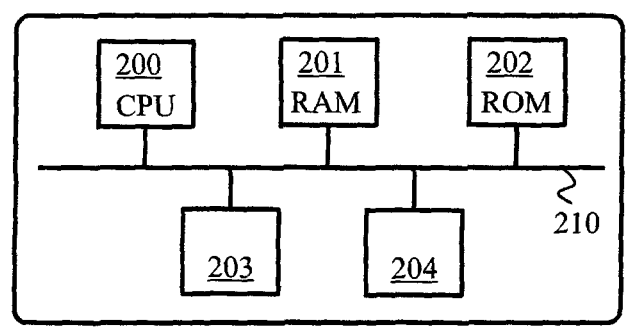
Figure 3:
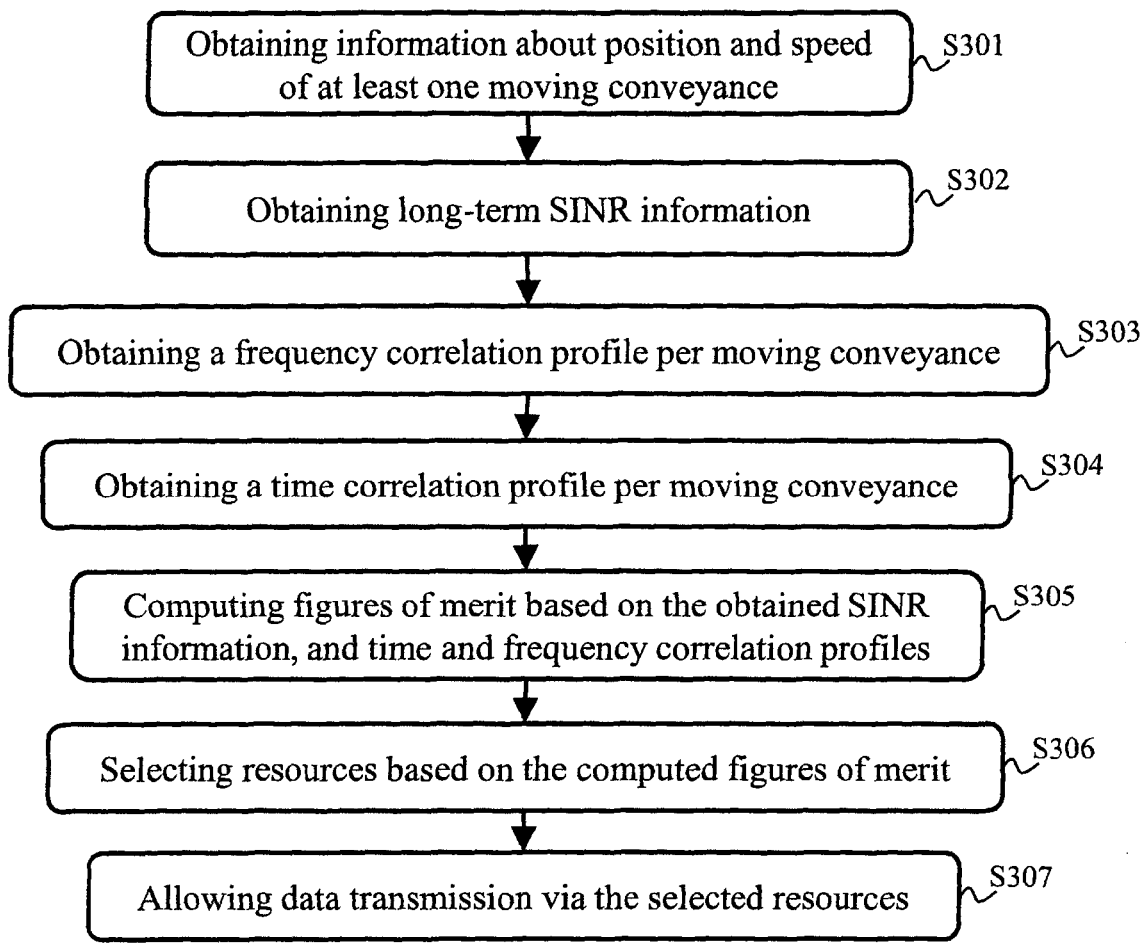
Figure 5:
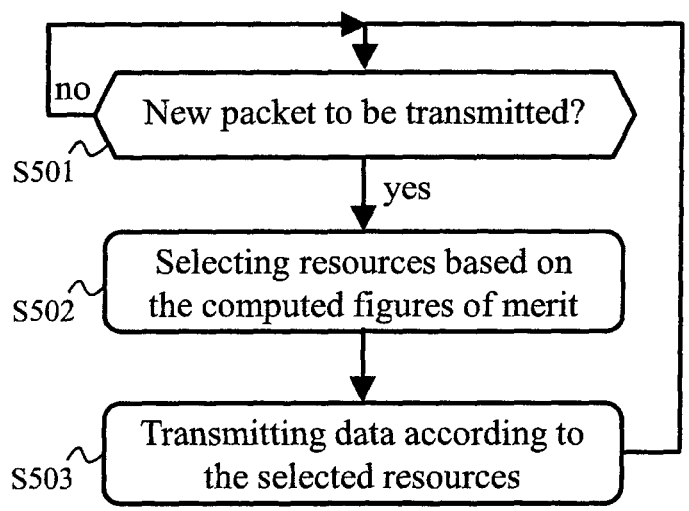
Figure 6A:
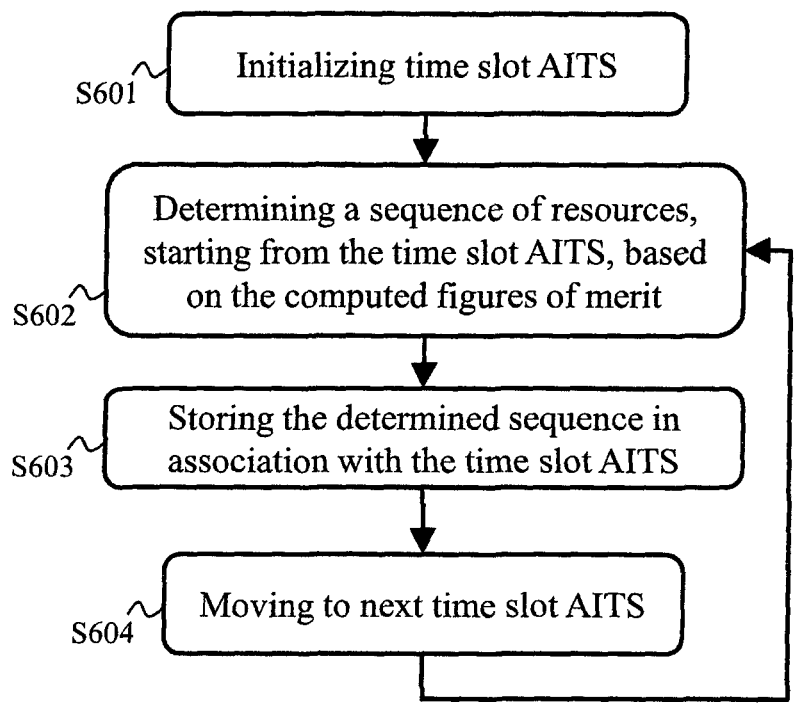
Figure 6B:
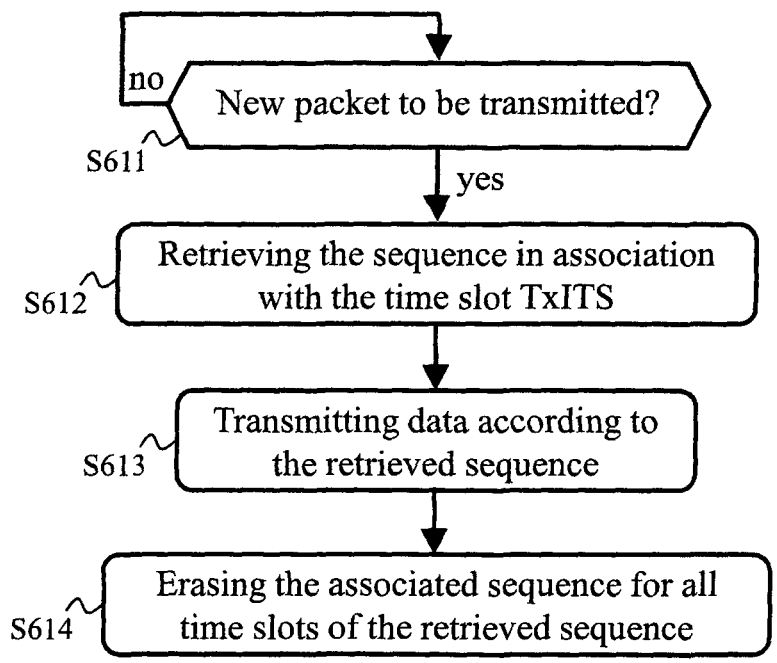
Figure 7:
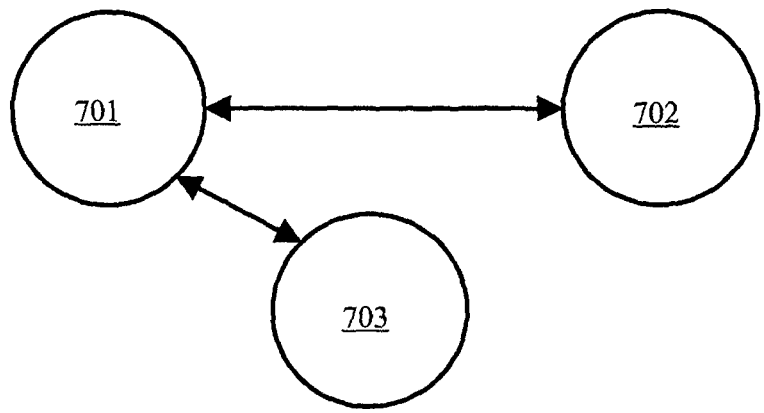
Figure 8:
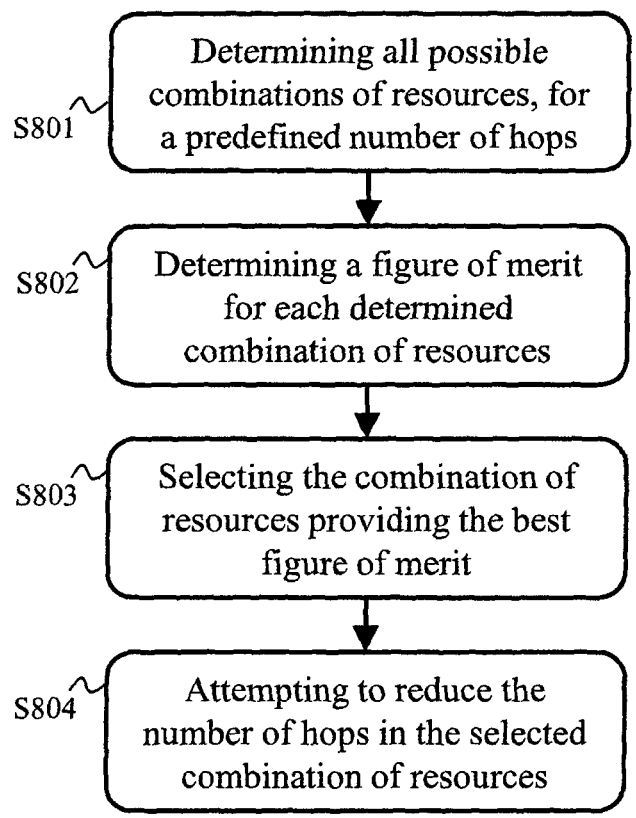
Figure 9:
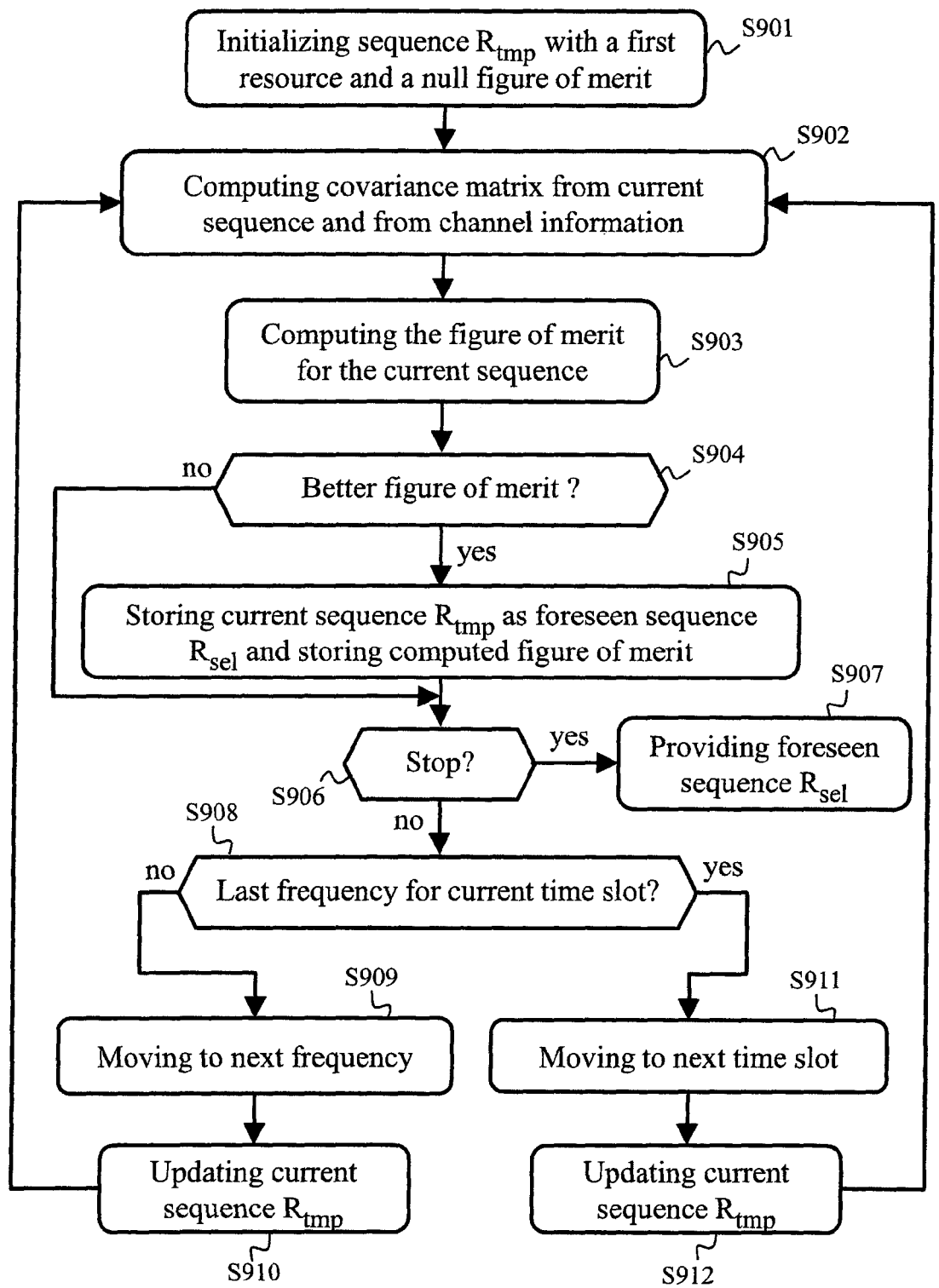
Figure 10:
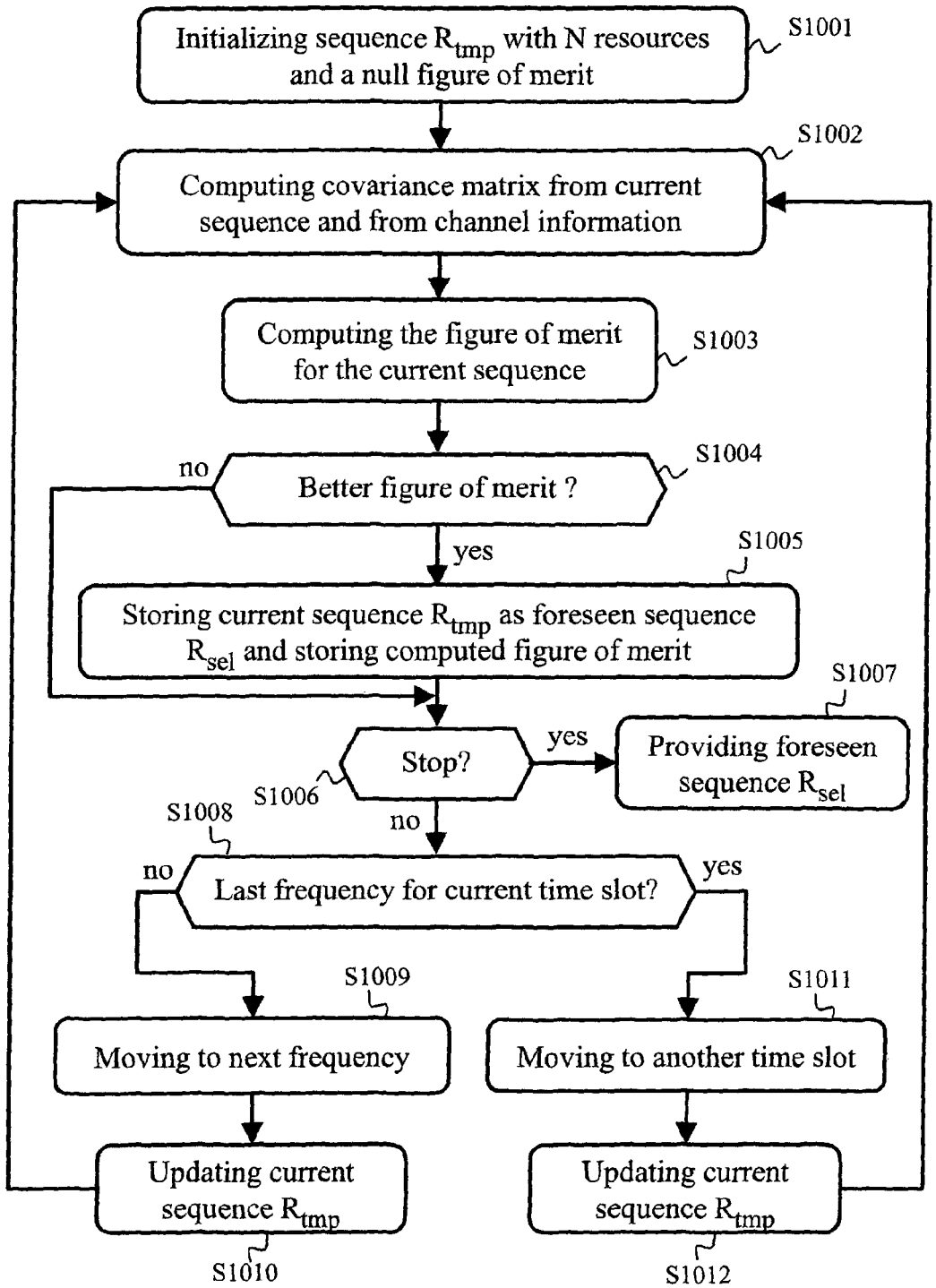
Figure 11:
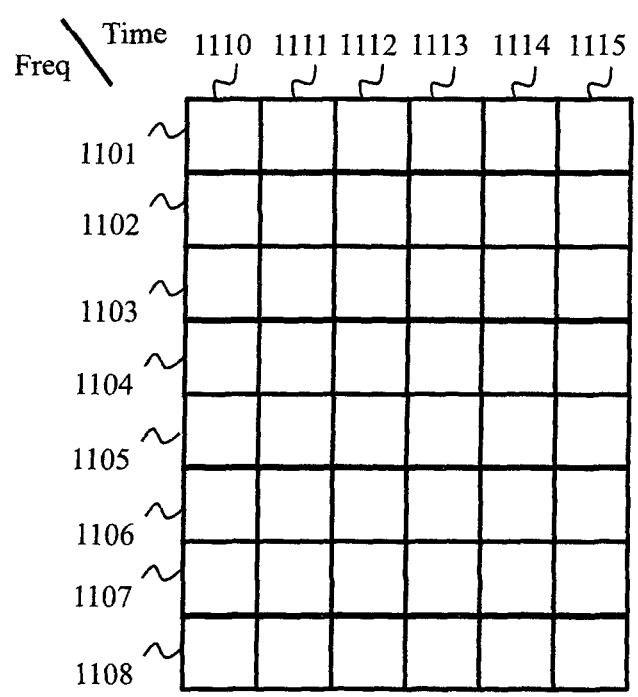
Figure 12A:
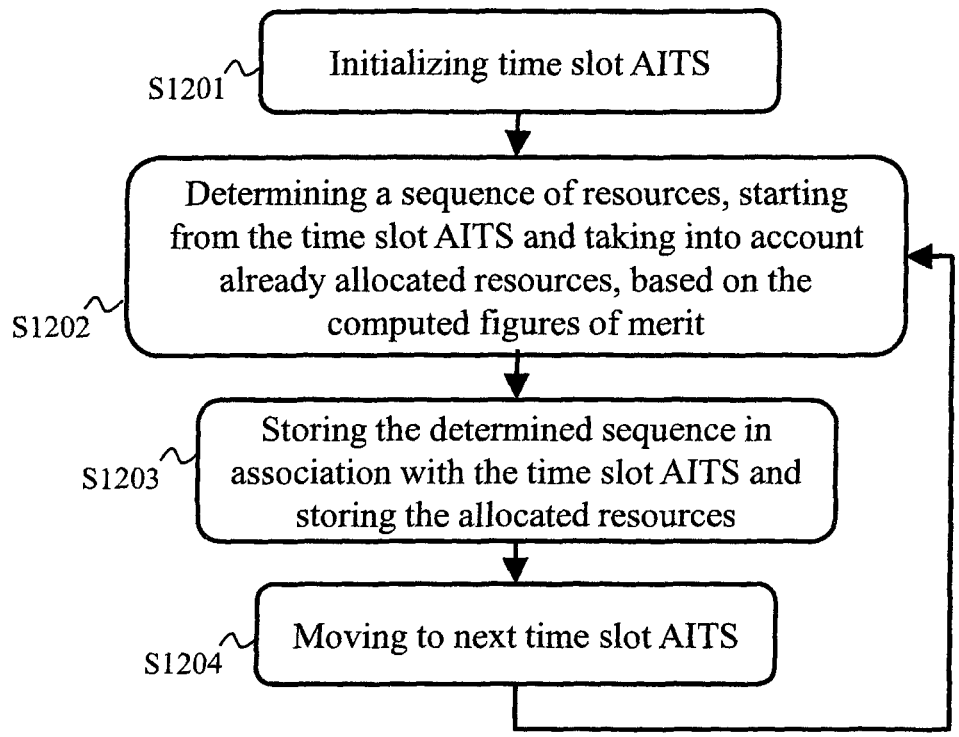
Figure 12B:
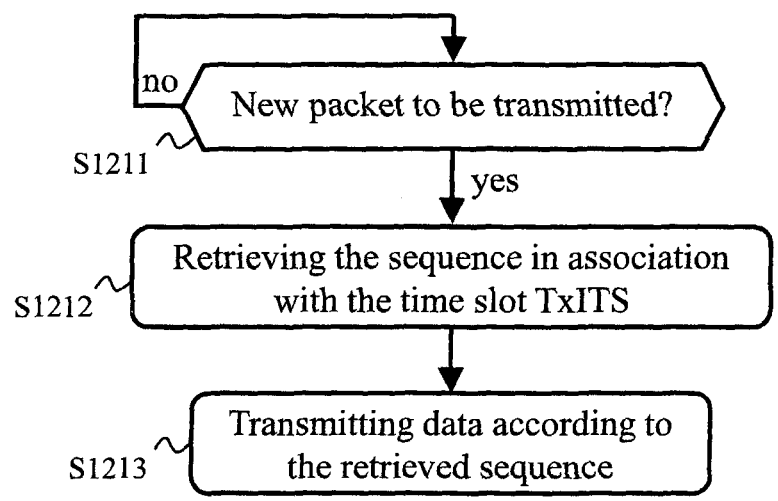
Figure 13:
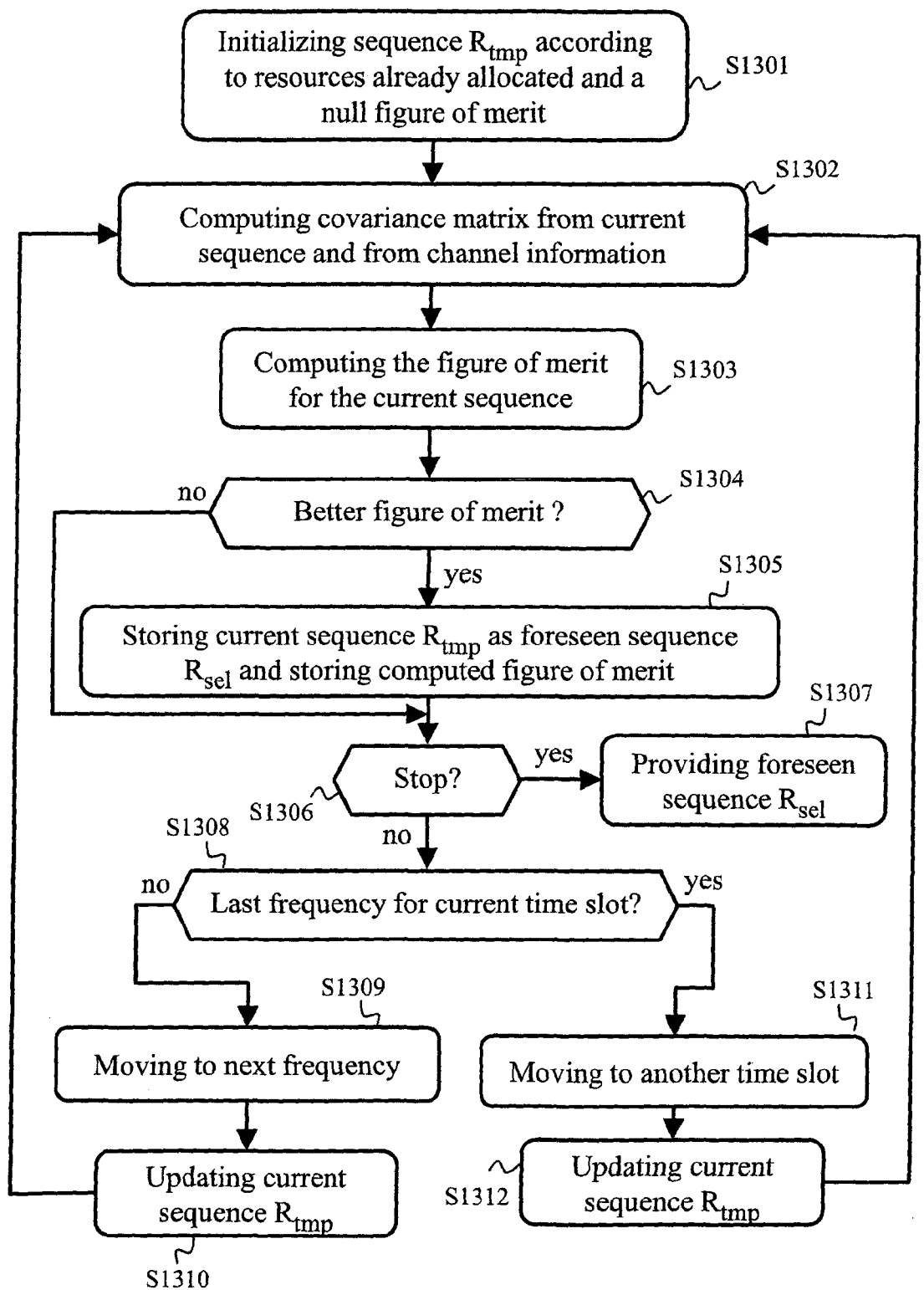

The characteristics of the invention will emerge more clearly from a reading of the following description of an example of embodiment, said description being produced with reference to the accompanying drawings, among which:

FIG. 1 schematically represents a wireless telecommunications system in which the present invention may be implemented;

FIG. 2 schematically represents an architecture of a processing device of the wireless telecommunications system;

FIG. 3 schematically represents an algorithm for allocating resources for communications between an access point of the wireless telecommunications system and at least one communication device located in at least one respective moving conveyance;

FIGS. 4A to 4G schematically represent configurations of the wireless telecommunications system for implementing the present invention;

FIG. 5 schematically represents an algorithm for transmitting data between the access point and at least one communication device located in at least one respective moving conveyance, according to a first embodiment;

FIGS. 6A and 6B schematically represent an algorithm for transmitting data between the access point and at least one communication device located in at least one respective moving conveyance, according to a second embodiment;

FIG. 7 schematically shows a process interconnection graph representing an implementation of the first embodiment or of the second embodiment;

FIG. 8 schematically represents a first algorithm for determining a frequency hopping sequence, in the context of the first embodiment or of the second embodiment;

FIG. 9 schematically represents a second algorithm for determining a frequency hopping sequence, in the context of the first embodiment or of the second embodiment;

FIG. 10 schematically represents a third algorithm for determining a frequency hopping sequence, in the context of the first embodiment or of the second embodiment;

FIG. 11 schematically represents a grid of time and frequency resources;

FIGS. 12A and 12B schematically represent an algorithm for transmitting data between the access point and at least one communication device located in at least one respective moving conveyance, according to a third embodiment;

FIG. 13 schematically represents an algorithm for determining a frequency hopping sequence, in the context of the third embodiment.

FIG. 1 schematically represents a wireless telecommunications system in which the present invention may be implemented.

The wireless telecommunications system comprises APs 110, 111 located along a path 170 of a moving conveyance 130. The moving conveyance 130 is for instance a train and the path is the railroad guiding the train from a departure station to an arrival station. According to another example, the moving conveyance 130 is a bus and the path is a predefined route followed by the bus.

The APs 110, 111 offer services of the wireless telecommunications system to communication devices, such as the communication device 131 located in the moving conveyance 130. The communication device 131 is for instance a mobile terminal or a relay station allowing mobile terminals located in the moving conveyance to access the services of the wireless telecommunications system via the APs.

The wireless telecommunications system may further comprise a server 100, for instance implemented in a core network implementing centralized radio resources management and/or mobility management functionalities.

The APs 110, 111 may be interconnected one with each other, thus implementing decentralized radio resources management and/or mobility management functionalities.

Static interferers 150, 151, 152, 153 may be located sufficiently close to the path 170 of the moving conveyance 130 to impact the downlink communications from the APs 110, 111 to the communication device 131 located in the moving conveyance 130. Such interferers 150, 151, 152, 153 are for instance WiFi (registered trademark) access points, conforming to the IEEE 802.11 standards.

Other static interferers 140, 141 may be located sufficiently close to the AP 110 to impact the uplink communications from the communication device 131 located in the moving conveyance to the AP 110. Such interferers 140, 141 are for instance WiFi (registered trademark) access points, conforming to the IEEE 802.11 standards.

A processing device is in charge of determining the appropriate resources allocation for the communications between the APs 110, 111 to at least one communication device, such as the communication device 131, in at least one respective moving conveyance. As detailed hereafter with regard to FIGS. 4A to 4G, the processing device can be located in, or connected to, the server 100, the APs 110, 111, or said communication device(s).

Communications between the APs 110, 111 and said communication device(s) located in the respective moving conveyance(s) are performed over a fast fading frequency selective channel relying on plural frequencies, in order to allow frequency diversity and/or interference avoidance thanks to frequency hopping.

FIG. 2 schematically represents an architecture of the processing device. According to the shown architecture, the processing device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) or an SD (Secure Digital) card reader 203, or any other device adapted to read information stored on storage means; a communication interface 204.

The communication interface 204 allows the processing device to communicate with the communication device 131 located in the moving conveyance 130 and/or with the APs 110, 111 and/or with the server 100.

CPU 200 is capable of executing instructions loaded into RAM 201 from ROM 202 or from an external memory, such as an SD card or the HDD. After the processing device has been powered on, CPU 200 is capable of reading instructions from RAM 201 and executing these instructions. The instructions form one computer program that causes CPU 200 to perform some or all of the steps of the algorithms described hereafter with regard to FIGS. 3, 5, 6A, 6B, 8, 9, 10, 12A, 12B and 13.

Any and all steps of the algorithms described hereafter with regard to FIGS. 3, 5, 6A, 6B, 8, 9, 10, 12A, 12B and 13, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm, performed by the processing device, for allocating time and frequency resources for a communication between an AP of the wireless telecommunications system, such as AP 110, and at least one communication device, such as the communication device 131, located in at least one respective moving conveyance.

It can be noticed that a time and frequency resource can be used to transmit a data packet addressed to a communication device in a moving conveyance, or to plural communication devices in plural respective moving conveyances (multicast), or the time and frequency resource can be used to transmit plural data packets addressed to plural communication devices in plural respective moving conveyances (e.g. Time Division Multiple Access). It therefore means that allocating time and frequency resources may concern downlink communications from an AP to at least one communication device located in at least one respective moving conveyance, or may concern uplink communications from at least one communication device located in at least one respective moving conveyance to an AP.

In a step S301, the processing device obtains a position of at least one moving conveyance along the path 170. The position may be expressed as an absolute value in a geographical coordinate system, or as a relative value with respect to fixed reference points, such as with respect to the respective positions of the APs 110, 111. The position may be the actual position of the moving conveyance(s) or a position at which the moving conveyance(s) is(are) supposed to be located at another instant, e.g. for predicting a future situation. In one embodiment, only one moving conveyance, such as the moving conveyance 130 is considered. In another embodiment, more than one moving conveyance is considered and the algorithm tries to find a trade-off in the time and frequency resources allocation in order to enhance transmissions between the APs 110, 111 and communication devices located in the moving conveyances.

According to a first example, the position of a considered moving conveyance is obtained from GPS (Global Positioning System) information provided by the a GPS receiver associated with a communication device located in the considered moving conveyance and transmitted by said communication device toward the processing device.

According to a second example, the position of a considered moving conveyance is obtained from received signal power information determined by a communication device located in the considered moving conveyance from signals received from the APs 110, 111. Knowing the position of the APs 110, 111, and knowing the path 170 followed by the considered moving conveyance, allows determining the position of said communication device from measurements of power of the signals received by said communication device from the APs 110, 111. Each received signal power information is transmitted by said communication device toward the processing device.

According to a third example, the position of a considered moving conveyance is obtained from received signal power information determined by the APs 110, 111, from signals received from a communication device located in the considered moving conveyance. Knowing the position of the APs 110, 111, and knowing the path 170 followed by the considered moving conveyance, allows determining the position of said communication device from measurements of power of the signals received by the APs 110, 111 from said communication device. The received signal power information is transmitted by the APs 110, 111 toward the processing device.

According to a fourth example, the position of a considered moving conveyance is obtained thanks to sensors placed along the path 170 and adapted to detect when a moving conveyance goes through. Notifications of such detection are transmitted by the sensors toward the processing device.

Moreover, a position may correspond to a segment of the path 170. Plural effective consecutive positions on the path 170 may then be associated with a single position for the purpose of the invention.

In the step S301, the processing device further obtains information about the respective speed of the moving conveyance(s) at the respective obtained position. The speed of a considered moving conveyance may be obtained by estimation, on the basis of preceding positions of the considered moving conveyance and time differences between said preceding positions and said obtained position. The speed of the considered moving conveyance may be obtained thanks to a speed sensor placed in the considered moving conveyance.

In a step S302, the processing device obtains long-term SINR (Signal-plus-Interference to Noise Ratio) information for each time and frequency resource potentially concerned by the allocation.

For downlink communications from an AP to a communication device in a considered moving conveyance, the long-term SINR information is data that allows characterizing the useful signal power and the interference level related to the static interferers 150, 151 located along the path 170, as expected to be perceived by the communication device in the considered moving conveyance along the path 170, for each frequency and each position of the moving conveyance. Such a useful signal power and interference level can be obtained from measurements performed by said communication device. For example, the measurements are the received signal power on a given frequency resource at a given position for at least one moving conveyance, or a frame error rate from which a short-term SINR can be deduced and therefore a long-term SINR can be obtained by averaging the short-term SINR.

For uplink communications from a communication device in a considered moving conveyance to an AP, the long-term SINR information is data that allows characterizing the useful signal power and the interference level related to the static interferers 140, 141 located close to the AP, as expected to be perceived the AP when receiving signals from the communication device in the considered moving conveyance along the path 170, for each frequency and each position of the moving conveyance in the coverage of the AP. Such a useful signal power and interference level can be obtained from measurements performed by said AP. For example, the measurements are the received signal power on a given frequency resource at a given position for at least one moving conveyance, or a frame error rate from which a short-term SINR can be deduced and therefore a long-term SINR can be obtained by averaging the short-term SINR.

Alternatively, either for downlink communications or for uplink communications, one can rely on statistics of acknowledgements when an ACK/NACK (Acknowledgement/Non-Acknowledgement) mechanism is implemented in the communication protocol. Long-term SINR information at the position of the considered moving conveyance as obtained in the step S301, and at upcoming positions along the path 170, can therefore be obtained by the processing device. Said upcoming positions along the path 170 are those at which the considered moving conveyance is expected to be located for the upcoming time slots of the time and frequency resources. Said upcoming positions may be determined by the processing device on the basis of the position of the considered moving conveyance, as obtained in the step S301, and the speed of the consider moving conveyance, also as obtained in the step S301.

In a preferred embodiment, the processing device determines such a useful signal and interference level from a fingerprint map of long-term SINR stored in a database, the fingerprint map of long-term SINR being built from the useful signals power and interference observed during preceding journeys on the path 170 of the moving conveyance 130, or other moving conveyances, as a function of a position on the path 170 or of a segment of the path 170. As will be detailed hereafter with regard to FIGS. 4A to 4G, the database storing the fingerprint map of long-term SINR can be located in, or connected to, the server 100, the APs 110, 111, or a communication device located in a moving conveyance moving along the path 170, such as the communication device 131. The database storing the fingerprint map of long-term SINR can be implemented in a different location than the processing device, the device in which the database is implemented hence providing the contents of the database to the processing device.

In a step S303, the processing device obtains at least one frequency correlation profile. The frequency correlation profile is representative of a correlation between the frequencies of the time and frequency resources potentially concerned by the allocation. To achieve this, in a first approach, the covariance of the instantaneous power for the different frequencies is obtained from channel estimations at different time intervals included in the coherence time of the fast fading frequency selective channel in order to provide a robust estimation of the frequency covariance. Then, normalization is performed to obtain frequency correlation information. In a second approach, the processing device obtains at least one frequency correlation profile respectively corresponding to the obtained position(s) of the moving conveyance(s). The frequency correlation profile is then stored in a fingerprint map, preferably in the same database as the fingerprint map of long-term SINR. The frequency correlation profile may be built from multipath statistics resulting from observations performed during preceding journeys on the path 170 of the moving conveyance 130, or other moving conveyances, as a function of a position on the path 170 or of a segment of the path 170. At a given position of the considered moving conveyance on the path 170, fast fading frequency selective channel estimation is performed and an instantaneous discrete impulse response of the channel is obtained, said instantaneous discrete impulse response depending on the fast fading effective realization. Then, the instantaneous power profile is obtained by computing the square modulus of each complex value associated to each tap of the obtained instantaneous discrete impulse response of the channel. Then, several instantaneous power profiles obtained over time for said given position of the considered moving conveyance are averaged in order to compute an estimated power delay profile for the fast fading frequency selective channel, which represents statistical behaviour of the fast fading frequency selective channel, for example by assuming that each tap effective realization is complex Gaussian distributed. Then, normalization of the power delay profile is performed by dividing each tap power by the sum of all taps powers. The Fourier transform of the normalized power delay profile is then computed in order to provide the frequency correlation profile. Frequency correlation information representative of multipath at the position of the considered moving conveyance as obtained in the step S301, and at the upcoming positions along the path 170, can therefore be obtained by the processing device.

In a step S304, the processing device obtains at least one time correlation profile. To achieve this, in a first approach, the covariance of the instantaneous power of the fast fading frequency selective channel is obtained from channel estimations at different time intervals. Then, normalization is performed to obtain time correlation information. In a second approach, the time correlation profile can be obtained from a model dependent on the speed of the considered moving conveyance and a Doppler frequency shift model. A Doppler frequency shift model, such as the Jakes' model, is by definition the Fourier transform of the correlation of the channel fading in the time domain. Thus, from the Doppler spectrum model, time correlation information can be obtained. Time correlation information according to the speed value obtained in the step S301 for the considered moving conveyance can therefore be obtained by the processing device.

In a step S305, the processing device computes figures of merit for sequences of time and frequency resources, based on the obtained long-term SINR information, on the obtained frequency correlation profile(s) and on the obtained time correlation profile(s). To do so, the processing device may combine, into one instantaneous SINR covariance matrix for each moving conveyance, the time correlation information, the frequency correlation information corresponding to the position of the considered moving conveyance and the long-term SINR information corresponding to the position of the considered moving conveyance. Each instantaneous SINR covariance matrix therefore characterises the statistics of the instantaneous SINR expected to be observed by a communication device located in the considered moving conveyance, such as the communication device 131 for downlink communications and by the access points, such as AP 110 for uplink communications.

The figures of merit are quantities, resulting for an application of a predefined function, used to characterize the performance of the sequences of time and frequency resources. In other words, the figures of merit are values representative of the expected error rate for the sequences of time and frequency resources.

Let's consider transmission and potentially at least one retransmission of data via a sequence of N time and frequency resources. The average probability of error $P_e$ after the corresponding transmissions of the N copies of the data and independent decoding can be expressed as follows:

$$P_e = E\left[\prod_{i=1}^{N} f(\alpha_{R_i})\right]$$

wherein:
$\alpha_{R_i}$ is the instantaneous SINR observed during the transmission on the time and frequency resource $R_i$ of the i-th transmission in the sequence;
f(x) is the probability of error of a single transmission of the data on an AWGN (Additive White Gaussian Noise) channel with SNR (Signal to Noise Ratio) x; and
E[•] is the mathematical expectation on the fast fading channel.

In a particular embodiment, a function F for computing the aforementioned figures of merit when considering one moving conveyance is defined as follows, which represents an expected probability of success of said transmission, and which should be maximized:

$$F(\Sigma(R_1, \ldots, R_N)) = \det(I + \Sigma(R_1, \ldots, R_N))$$

wherein:
det(X) is the determinant of X;
I is the identity matrix;
$\Sigma(\bullet)$ is an N×N matrix representing the covariance between the N coefficients of an equivalent channel resulting from the frequency hopping transmission and that affects the instantaneous SINR from one transmission of the data to the other, and which can be expressed as follows:

$$\Sigma_{i,j} = E[\alpha_{R_i}\alpha_{R_j}^*] = \sqrt{\rho_{R_i}}\sqrt{\rho_{R_j}}\Sigma_t(\tau(R_i,R_j))\Sigma_f(\Delta f(R_i,R_j))$$

wherein:
x* is the complex conjugate of x
$\Sigma_{i,j}$ represents the covariance between the instantaneous SINRs corresponding to the time and frequency resources $R_i$ and $R_j$;
$\rho_{R_i}$ represents the long-term SINR for the time and frequency resource $R_i$;
$\rho_{R_j}$ represents the long-term SINR for the time and frequency resource $R_j$;
$\tau(R_i, R_j)$ represents the time difference between the time and frequency resources $R_i$ and $R_j$;
$\Delta f(R_i, R_j)$ represents the frequency difference between the time and frequency resources $R_i$ and $R_j$;
$\Sigma_t$ is a temporal correlation function of the fast fading frequency selective channel, wherein $\Sigma_t(0)=1$ by definition of the correlation, which is the covariance between two random variables divided by their standard deviation;
$\Sigma_f$ is a frequency correlation function of the fast fading frequency selective channel, wherein $\Sigma_f(0)=1$ by definition.

In a particular embodiment, wherein the processing device has an estimation of the power delay profile for each considered position of the moving conveyance 130 on the path 170, the correlation between two frequencies is computed from the Fourier transform of the power delay profile, as already explained.

In another particular embodiment wherein an acknowledged transmission of data is assumed, using the same notations as above, the function F for computing the aforementioned figures of merit when considering one moving conveyance is defined as follows, which represents an expected throughput of said transmission, and which should be maximized:

$$F\left(\sum (R_1, \ldots, R_N)\right) = \sum_{i=1}^{N} \frac{1}{i}\left(1 - \det\left(I + \sum (R_1, \ldots, R_i)\right)^{-1}\right) \prod_{j=1}^{N-1} \det\left(I + \sum (R_1, \ldots, R_j)\right)^{-1}$$

In a particular embodiment, a function F' for computing the aforementioned figures of merit when considering plural moving conveyances is defined as follows:

$$F'=\min(F(\Sigma_k(R_1, \ldots, R_N)))$$

wherein k is an index of said moving conveyances.

In other words, the processing device determines one figure of merit as a result of the function F per moving conveyance and for each potential sequence of time and frequency resources and associates with each potential sequence the figure of merit being the minimum among the figures of merit determined for the moving conveyances and for said sequence.

In both cases wherein the figures of merit are related to the expected probability of success or expected throughput of said transmissions, the function F' should be maximized in order to define the time and frequency resources $R_1, \ldots, R_N$ that achieve the best trade-off between the figures of merits of the considered plural moving conveyances.

In a step S306, the processing device selects the sequence of time and frequency resources that provides a figure of merit, among the figures of merit of the considered sequences of time and frequency resources, that expects reaching the target QoS for the data transmission or that is the best figure of merit, e.g. the sequence of time and frequency resources that maximizes the figures of merits F when a single moving conveyance is considered, or F' when plural moving conveyances are considered.

In a step S307, the processing device allows a transmission of data via the selected time and frequency resources. As detailed hereafter, the time and frequency resources may be a priori selected, i.e. without taking care of whether data effectively needs to be transmitted, or selected on purpose, i.e. upon detection that data needs to be transmitted.

FIGS. 4A to 4G schematically represent configurations of the wireless telecommunications system for implementing the present invention. FIGS. 4A to 4G show the server 100, the communication device 131 located in the moving conveyance 130, as well as the AP 110. The configuration is duplicated for the other APs of the wireless telecommunications system.

Figures 4A, 4B:
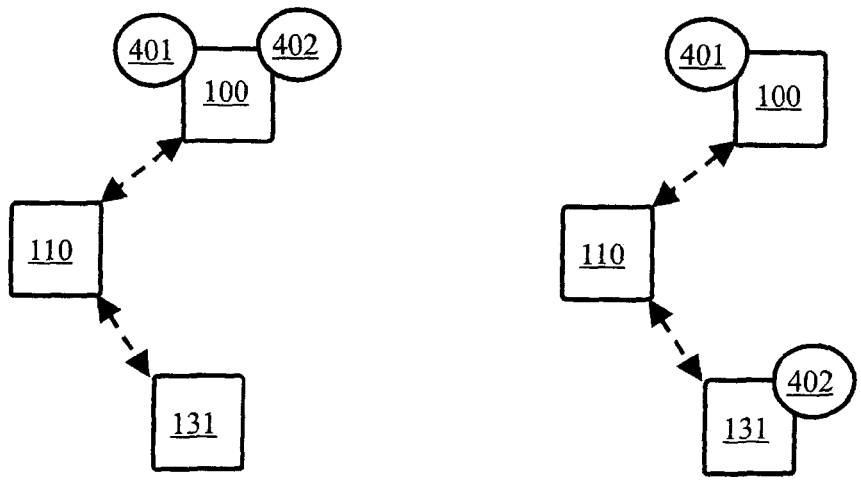

FIG. 4A schematically represents a first configuration. In this configuration, the processing device 402 is located in, or connected to, the server 100. The fingerprint map 401 of long-term SINR is also located in, or connected to, the server 100. In this configuration, the server 100 receives, via the AP 110, from the communication device 131 located in the moving conveyance 130 any data for updating the fingerprint map 401 of long-term SINR.

FIG. 4B schematically represents a second configuration. In this configuration, the processing device 402 is located in, or connected to, the communication device 131 located in the moving conveyance 130. The fingerprint map 401 of long-term SINR is located in, or connected to, the server 100. In this configuration, the server 100 receives, via the AP 110, from the communication device 131 located in the moving conveyance 130 any data for updating the fingerprint map 401.

Alternatively, the update of the fingerprint map 401 of long-term SINR may be performed via data storage portable means, such as a USB (Universal Serial Bus) flash drive, that is firstly plugged to the communication device 131 for transferring to the USB flash drive data stored in the database during the journey of the moving conveyance on the path 170, and that is secondly plugged to the server 100 for transferring to the server 100 the data stored by the USB flash drive. Transfers of measurements for the frequency correlation profile(s) can be performed in the same way.

FIG. 4C schematically represents a third configuration. In this configuration, the processing device 402 is located in, or connected to, the AP 110. The fingerprint map 401 of long-term SINR is also located in, or connected to, the AP 110. In this configuration, the AP 110 receives from the communication device 131 located in the moving conveyance 130 any data for updating the fingerprint map 401.

FIG. 4D schematically represents a fourth configuration. In this configuration, the processing device 402 is located in, or connected to, the AP 110. The fingerprint map 401 of long-term SINR is located in, or connected to, the server 100. A partial fingerprint map 403 of long-term SINR is located in, or connected to, the AP 110. This partial fingerprint map 403 of long-term SINR corresponds to a portion of the fingerprint map 401 for the part of the path 170 that is in the area managed by the AP 110. In this configuration, the server 100 receives, via the AP 110, from the communication device 131 located in the moving conveyance 130 any data for updating the fingerprint map 401. The AP 110 receives from the server 100 any data for updating the partial fingerprint map 403 of long-term SINR.

FIG. 4E schematically represents a fifth configuration. In this configuration, the processing device 402 is located in, or connected to, the communication device 131 located in the moving conveyance 130. The fingerprint map 401 of long-term SINR is located in, or connected to, the AP 110. In this configuration, the AP 110 receives from the communication device 131 located in the moving conveyance 130 any data for updating the fingerprint map 401.

FIG. 4F schematically represents a sixth configuration. In this configuration, the processing device 402 is located in, or connected to, the communication device 131 located in the moving conveyance 130. The fingerprint map 401 of long-term SINR is located in, or connected to, the server 100. The partial fingerprint map 403 of long-term SINR is located in, or connected to, the AP 110. In this configuration, the server 100 receives, via the AP 110, from the communication device 131 located in the moving conveyance 130 any data for updating the fingerprint map 401. The AP 110 receives from the server 100 any data for updating the partial fingerprint map 403 of long-term SINR.

Alternatively, the update of the fingerprint map 401 of long-term SINR may be performed via data storage portable means, such as a USB flash drive, that is firstly plugged to the communication device 131 for transferring to the USB flash drive data stored in the database during the journey of the moving conveyance on the path 170, and that is secondly plugged to the server 100 for transferring to the server 100 the data stored by the USB flash drive.

Figure 4G:
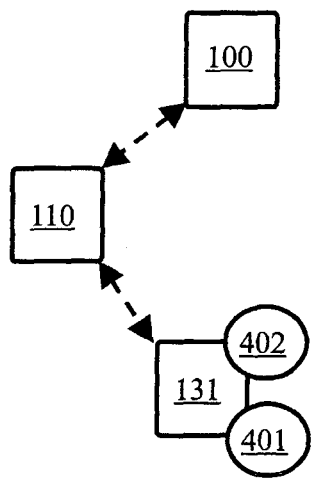

FIG. 4G schematically represents a seventh configuration. In this configuration, the processing device 402 is located in, or connected to, the communication device 131 located in the moving conveyance 130. The fingerprint map 401 of long-term SINR is also located in, or connected to, the communication device 131 located in the moving conveyance 130.

In a preferred embodiment, the configuration shown in FIG. 4A is implemented.

As already mentioned, the frequency correlation profile is preferably stored in the same database, i.e. at the same location, as the fingerprint map 401 of long-term SINR. Partial frequency correlation profile may also be implemented as for the long-term SINR information, and is then located at the same location as the partial fingerprint map 403 of long-term SINR.

Measurement data, such as measurements for the time correlation profiles and possible measurements for the frequency correlation profiles, or information about the speed of the moving conveyance(s), which cannot be provided at the end of the journey of the moving conveyance(s) along the path 170, are provided on the fly by the device performing the measurements toward the processing device by using communication means provided by the wireless telecommunications system.

FIG. 5 schematically represents an algorithm for transmitting data between the AP 110 or the AP 111 and at least one communication device, such as the communication device 131, located in at least one respective moving conveyance, according to a first embodiment. In the first embodiment, it is assumed that the selection of time and frequency resources is performed on the fly each time the processing device detects that data has to be transmitted.

In a step S501, the processing device checks whether data, i.e. a new data packet, has to be transmitted, for which time and frequency resources need to be allocated. When data has to be transmitted, a step S502 is performed; otherwise, the step S501 is reiterated.

In the step S502, the processing device selects time and frequency resources from figures of merit for sequences of time and frequency resources, based on long-term SINR information, frequency correlation profile and time correlation profile, as already mentioned. The selected time and frequency resources form a sequence including N time and frequency resources, hence corresponding to a number N−1 of retransmission(s) of the data, wherein the number N of transmissions of the data allows reaching a target Quality of Service (QoS). The target QoS is mapped to a threshold value of the figure of merit, or results from a maximization or minimization of the figure of merit. When N equals to 1, only one transmission of the data is supposed to be performed and no retransmissions are supposed to be performed. Detailed embodiments for selecting the time and frequency resources are detailed hereafter with regard to FIGS. 8 to 10.

In a step S503, the processing device allows transmitting the data according to the selected time and frequency resources. Either the processing device is included in the concerned transmitter, and then the processing device internally instructs the transmitter to transmit the data via the selected resources; or the processing device is connected to the concerned transmitter, and then the processing device transmits a message to the transmitter informing the transmitter about the selected resources to be used to transmit the data.

In a particular embodiment, an acknowledged transmission with ACK/NACK mechanism is implemented. Therefore, when an ACK is received for the transmitted data and when not all the selected time and frequency resources have been yet consumed for transmitting data, the unused time and frequency resources among the time and frequency resources that have been allocated but not consumed for transmitting data are released and can be reused in a further selection of time and frequency resources.

In other words, by applying the algorithm of FIG. 5, the processing device detects that the data transmission shall become effective and then selects, from a time slot from which the data transmission shall become effective, the sequence of time and frequency resources that provides the figure of merit that expects reaching a target QoS.

FIGS. 6A and 6B schematically represent an algorithm for transmitting data from the AP 110 or the AP 111 to at least one communication device located in at least one respective moving conveyance 130, according to a second embodiment. In the second embodiment, it is assumed that the selection of time and frequency resources starting at a time slot AITS ("Allocation Initial Time Slot") is performed asynchronously from packet arrival, in advance with respect to the first time slot in sequence TxITS ("Transmission Initial Time Slot") used for effectively transmitting the packet. Hence, the algorithm part of FIG. 6A illustrates how to determine sequences of time and frequency resources and the algorithm part of FIG. 6B illustrates how to effectively transmit the data via the determined sequences.

Referring to FIG. 6A, in a step S601, the processing device initialises a parameter representing the time slot AITS, i.e. the first time slot in the sequence to determine.

In a step S602, the processing device determines from figures of merit the sequence of time and frequency resources, starting from the time slot AITS, based on long-term SINR information, frequency correlation profile and time correlation profile, as already mentioned. The sequence includes a number N of time and frequency, therefore corresponding to a number N−1 of retransmission(s) of the data, wherein the number N of transmissions of the data allows reaching the target QoS. Detailed embodiments for determining the sequence, starting from the time slot AITS, of time and frequency resources are provided hereafter with regard to FIGS. 8 to 10.

In a step S603, the processing device stores in memory the determined sequence, in association with information representative of the time slot AITS. Therefore, when a packet has to be transmitted from the time slot TxITS that matches the time slot AITS for which the sequence has been stored in the step S603, the packet is transmitted according to the stored sequence. This aspect is detailed hereafter with regard to FIG. 6B.

In a step S604, the processing device moves to the next time slot, which becomes the new time slot AITS from which a new sequence of time and frequency resources needs to be determined, updates the parameter representing the time slot AITS accordingly and repeats the step S602. Therefore a sequence is determined, and stored, for each time slot from which a transmission of a data can possibly start.

Referring now to FIG. 6B, in a step S611, the processing device checks whether data, i.e. a new data packet, has to be transmitted. When data has to be transmitted, a step S612 is performed; otherwise, the step S611 is repeated.

In the step S612, the processing device retrieves the sequence, as stored in the step S603, associated with the time slot from which the transmission is expected to start.

In a step S613, the processing device allows transmitting the data according to the retrieved sequence. Either the processing device is included in the concerned transmitter, and then the processing device internally instructs the transmitter to transmit the data according to the retrieved sequence; or the processing device is connected to the concerned transmitter, and then the processing device transmits a message to the transmitter informing the transmitter about the time and frequency resources to be used to transmit the data.

In a step S614, the processing device erases from memory the sequences that were stored during execution of the algorithm part of FIG. 6A and that were associated with the time slot TxITS and the sequences associated with all the following time slots of the retrieved sequence, as well as the sequence associated with time slots preceding the time slot TxITS.

In a variant of the step S614, when an ACK/NACK mechanism is implemented, the processing device erases from memory the sequences that were stored during execution of the algorithm part of FIG. 6A and that were associated with the time slot TxITS, as well as the sequence associated with time slots preceding the time slot TxITS. The sequences associated with the time slots following the time slot TxITS effectively consumed by the data transmission are then erased during a following data transmission. Therefore, when an ACK is received for the transmitted data and when not all the selected time and frequency resources have been yet consumed for transmitting data, the corresponding sequences stored in association with the unused time and frequency resources among the time and frequency resources previously allocated for transmitting the data are not erased and can be used for transmitting data.

By applying the algorithm of FIGS. 6A and 6B, the processing device selects, for each time slot, a sequence of time and frequency resources that provides the figure of merit that expects reaching a target QoS and stores in memory the selected sequence in association with said time slot AITS, and, when the data transmission becomes effective, the processing device retrieves from memory the sequence associated with the time slot TxITS from which the data transmission becomes effective.

FIG. 7 schematically shows a process interconnection graph representing an implementation of the first embodiment or of the second embodiment.

The interconnection graph shown in FIG. 7 comprises a first process 701 for allocating time and frequency resources, a second process 702 for gathering and updating channel information and a third process 703 for monitoring data packets transmissions.

The first process 701 is in charge of determining the sequence of time and frequency resources for allowing to reach the target QoS, by using channel information provided by the second process 702. The channel information includes the long-term SINR information, the frequency correlation profile and the time correlation profile. Either the first process 701 is activated upon receiving an instruction from the third process 703, or is executed as a background task providing the sequence of time and frequency resources in a memory zone that is accessed by the third process 703 when needed. Identically, either the second process 702 is activated upon receiving an instruction from the first process 701 when a sequence of time and frequency resources has to be determined, or is executed as a background task providing the channel information in a memory zone that is accessed by the first process 701 when needed.

FIG. 8 schematically represents a first algorithm, performed by the processing device, for determining a sequence of time and frequency resources, in the context of the first embodiment or of the second embodiment. The first algorithm relates to an exhaustive approach.

In a step S801, the processing device determines all possible combinations of time and frequency resources, for a predefined length N of the sequence of time and frequency resources.

In a step S802, the processing device determines a figure of merit, as already explained, for each determined combination of time and frequency resources.

In a step S803, the processing device selects the combination of time and frequency resources having the best figure of merit.

In an optional step S804, the processing device attempts to reduce the number N of the selected combination of time and frequency resources. In other words, the processing device removes at least one time and frequency resource from the selected combination and checks whether the target QoS would be met. If the target QoS is considered to be met, the reduced combination of time and frequency resources is kept; otherwise, the combination of time and frequency resources selected in the step S803 is kept:

In a particular embodiment, when the processing device detects that the number N of selected combination of time and frequency resources doesn't allow reaching the target QoS, the processing device increments the number N by one unit and reiterates the steps S801 to S803, in order to attempt finding a sequence of time and frequency resources allowing to reach the target QoS.

FIG. 9 schematically represents a second algorithm, performed by the processing device, for determining a sequence of time and frequency resources, in the context of the first embodiment or of the second embodiment. The algorithm of FIG. 9 is an alternative to the algorithm of FIG. 8.

In a step S901, the processing device initialises a sequence $R_{tmp}$ of time and frequency resources. The initialised sequence $R_{tmp}$ consists of a first time and frequency resource. The processing device initialises a parameter CTS ("Considered Time Slot'"), which indicates a time slot for which the processing device currently tests the different frequencies that can be allocated in the transmission scheme. In the step S901, the time slot CTS corresponds to the aforementioned time slot AITS. The algorithm of FIG. 9 is detailed hereafter in conjunction with an illustrative example based on FIG. 11, which schematically represents a grid of time and frequency resources. The columns 1110 to 1115 of the grid represent successive time slots and the rows 1101 to 1108 represent frequencies that can be allocated in the transmission scheme. Therefore, each intersection of one column and one row represents a time and frequency resource. Let's consider that the processing device initialises the sequence $R_{tmp}$ with the time and frequency resource that is at the intersection of the row 1101 and the column 1110, i.e. the time slot AITS is the time slot represented by the column 1110.

Moreover, the processing device initialises a parameter $F_{best}$ at a null value. The parameter $F_{best}$ is representative of the best figure of merit computed by the processing device when executing the algorithm. Moreover, the processing device initialises the number N to a value of 1.

In a step S902, the processing device computes an N×N instantaneous SINR covariance matrix from the sequence $R_{tmp}$ and from channel information, as already explained with regard to FIG. 3. The channel information includes the long-term SINR information, the frequency correlation profile and the time correlation profile.

In a step S903, the processing device computes the figure of merit for the sequence $R_{tmp}$, on the basis of the instantaneous SINR covariance matrix computed in the step S902, as already detailed hereinbefore.

In a step S904, the processing device determines whether the figure of merit computed in the step S903 is greater than the figure of merit stored by the parameter $F_{best}$. When the figure of merit computed in the step S903 is greater than the figure of merit stored by the parameter $F_{best}$, a step S905 is performed; otherwise a step S906 is performed.

In the step S905, the processing device stores the sequence $R_{tmp}$ in a parameter $R_{sel}$. The parameter $R_{sel}$ is representative of the best sequence of time and frequency resources determined by the processing device when executing the algorithm. Moreover, the processing device stores the figure of merit, computed in the step S903, in the parameter $F_{best}$. Then, the step S906 is performed.

In the step S906, the processing device checks whether a predefined condition for stopping the execution of the algorithm of FIG. 9 is met. Such a condition is for instance that a timeout, activated when the algorithm of FIG. 9 is launched, has expired, which ensures that the processing time for the algorithm of FIG. 9 does not exceed a constrained time period, e.g. the duration of one time slot. According to another example, the condition is that the algorithm of FIG. 9 has looped a predefined number of times via the step S902. According to yet another example, the condition is that the figure of merit computed in the step S903 is greater than the figure of merit corresponding to the target QoS. When the condition for stopping the execution of the algorithm of FIG. 9 is met, a step S907 is performed; otherwise, a step S908 is performed.

In the step S907, the processing device selects the sequence of time and frequency resources identified by the parameter $R_{sel}$ and the algorithm ends.

In the step S908, the processing device checks whether the last frequency, which can be allocated in the transmission scheme, of the considered time slot CTS has been checked. When the last frequency of the considered time slot CTS has been checked, a step S911 is performed; otherwise, a step S909 is performed.

In the step S909, the processing device moves to a next frequency in the considered time slot CTS, i.e. the processing device decides to test, for the time slot CTS, another frequency that can be allocated in the transmission scheme. For instance, with regard to FIG. 11, if the processing device was considering the time and frequency resource at the intersection of the row 1101 and the column 1110, the processing device moves to another time and frequency resource in the column 1110, such as for instance the time and frequency resource at the intersection of the row 1102 and the column 1110. In other words, the processing device is about to consider another frequency in the considered time slot CTS represented by the column 1110. Then, in a step S910, the processing device updates the sequence $R_{tmp}$ accordingly. According to the example above, the processing device replaces in the sequence $R_{tmp}$ the time and frequency resource at the intersection of the row 1101 and the column 1110 by the time and frequency resource at the intersection of the row 1102 and the column 1110. Then, the step S902 is reiterated.

In the step S911, the processing device moves to a next time slot and updates the parameter CTS accordingly. For instance, with regard to FIG. 11, if the processing device was considering the time and frequency resources in the column 1110, the processing device is about to consider the time and frequency resources in the column 1111. The processing device selects one frequency among the frequencies that can be allocated in the transmission scheme. Then, in a step S912, the processing device updates the sequence $R_{tmp}$ accordingly, by copying the sequence $R_{sel}$ in the sequence $R_{tmp}$ and by adding a time and frequency resource in a time slot CTS that has not yet been considered. For instance, the processing device adds to the sequence $R_{tmp}$ the time and frequency resource at the intersection of the row 1101 and the column 1111. Then, the step S902 is reiterated.

Therefore, by executing the algorithm of FIG. 9, the processing device selects in the time slot AITS the time and frequency resource that provides the best transmission conditions, then in the following time slots the time and frequency resource that provides the best transmission conditions taking into account the time and frequency resource(s) already selected in the previous time slots, preferably until the figure of merit of the selection of time and frequency resources allows reaching the target QoS. The number of time and frequency resources in the sequence is not statically fixed but dynamically defined.

FIG. 10 schematically represents a third algorithm, performed by the processing device, for determining a sequence of time and frequency resources, in the context of the first embodiment or of the second embodiment. The algorithm of FIG. 10 is an alternative to the algorithms of FIGS. 8 and 9.

In a step S1001, the processing device initialises the sequence $R_{tmp}$ of time and frequency resources. The number N−1 of retransmissions of the data is a priori fixed in such a way that it is supposed be high enough to allow the processing device to find a frequency hopping sequence allowing to reach the target QoS. Therefore the initialised sequence $R_{tmp}$ consists of N time and frequency resource, which can be predefined, or defined in a random fashion, or defined according to past history of the time and frequency resources allocation. The algorithm of FIG. 10 is detailed hereafter in conjunction with an illustrative example based on FIG. 11. Let's consider that N equals to 4 and that the processing device initialises the sequence $R_{tmp}$ with the time and frequency resource that is at the intersection of the row 1102 and the column 1110, plus the time and frequency resource that is at the intersection of the row 1105 and the column 1111, plus the time and frequency resource that is at the intersection of the row 1103 and the column 1112, plus the time and frequency resource that is at the intersection of the row 1108 and the column 1113. The processing device also initialises a parameter CTS ("Considered Time Slot"), which indicates a time slot for which the processing device currently tests the different frequencies that can be allocated in the transmission scheme. The parameter CTS can be initialised such that the parameter CTS corresponds to the aforementioned time slot AITS, or randomly among the time slots considered by the sequence $R_{tmp}$. Moreover, the processing device initialises the parameter $F_{best}$ at a null value.

In a step S1002, the processing device computes an N×N instantaneous SINR covariance matrix from the sequence $R_{tmp}$ and from channel information, as already explained with regard to FIG. 3. The channel information includes the long-term SINR information, the frequency correlation profile and the time correlation profile.

In a step S1003, the processing device computes the figure of merit for the sequence $R_{tmp}$, on the basis of the instantaneous SINR covariance matrix computed in the step S1002, as already detailed hereinbefore.

In a step S1004, the processing device determines whether the figure of merit computed in the step S1003 is greater than the figure of merit stored by the parameter $F_{best}$. When the figure of merit computed in the step S1003 is greater than the figure of merit stored by the parameter $F_{best}$, a step S1005 is performed; otherwise a step S1006 is performed.

In the step S1005, the processing device stores the sequence $R_{tmp}$ in the parameter $R_{sel}$. Moreover, the processing device stores the figure of merit, computed in the step S1003, in the parameter $F_{best}$. Then, the step S1006 is performed.

In the step S1006, the processing device checks whether a predefined condition for stopping the execution of the algorithm of FIG. 10 is met. Such a condition is for instance that a timeout, activated when the algorithm of FIG. 10 is launched, has expired, which ensures that the processing time for the algorithm of FIG. 10 does not exceed a constrained time period, e.g. the duration of one time slot. According to another example, the condition is that the algorithm of FIG. 10 has looped a predefined number of times via the step S1002. According to yet another example, the condition is that the figure of merit computed in the step S1003 is greater than the figure of merit corresponding to the target QoS. According to yet another example, the condition is that a data packet needs to be transmitted as soon as possible. When the condition for stopping the execution of the algorithm of FIG. 10 is met, a step S1007 is performed; otherwise, a step S1008 is performed.

In the step S1007, the processing device selects the sequence of time and frequency resources identified by the parameter $R_{sel}$ and the algorithm ends.

In the step S1008, the processing device checks whether the last frequency, which can be allocated in the transmission scheme, of the considered time slot CTS has been checked. When the last frequency of the considered time slot CTS has been checked, a step S1011 is performed; otherwise, a step S1009 is performed.

In the step S1009, the processing device moves to a next frequency in the considered time slot CTS, i.e. the processing device decides to test, for the time slot CTS, another frequency that can be allocated in the transmission scheme. For instance, with regard to FIG. 11, if the processing device considers the time slot represented by the column 1110, the processing device moves to another time and frequency resource in the column 1110, such as for instance the time and frequency resource at the intersection of the row 1103 and the column 1110. In other words, the processing device is about to consider another frequency in the considered time slot CTS represented by the column 1110 in order to determine whether said another frequency would provide a better figure of merit. Then, in a step S1010, the processing device updates the sequence $R_{tmp}$ accordingly. According to the example above, the processing device replaces in the sequence $R_{tmp}$ the time and frequency resource at the intersection of the row 1102 and the column 1110 by the time and frequency resource at the intersection of the row 1103 and the column 1110. Then, the step S1002 is reiterated.

In the step S1011, the processing device moves to a another time slot among the time slots considered by the sequence $R_{tmp}$ and updates the parameter CTS accordingly. In other words, the processing device is about to consider another frequency in another time slot in order to determine whether said another frequency would provide a better figure of merit. For instance, according to the example above, if the processing device was considering the time and frequency resources in the column 1110, the processing device is about to consider the time and frequency resources in the column 1111 and is moreover about to consider the time and frequency resource at the intersection of the row 1101 and the column 1111 instead of the time and frequency resource at the intersection of the row 1105 and the column 1111. In a preferred embodiment, the processing device determines said another time slot by applying the following formula based on a modulus:

$$n = \mod(n,N)+1$$

wherein n represents an index of the time slot identified by the parameter CTS, among the time slots considered by the sequence $R_{tmp}$. The parameter CTS is therefore updated by adding the value of the index n to the time slot AITS.

Then, in a step S1012, the processing device updates the sequence $R_{tmp}$ accordingly, by copying the sequence $R_{sel}$ in the sequence $R_{tmp}$ and by changing the time and frequency resource in said another time slot. For instance, the processing device replaces in the sequence $R_{tmp}$ the time and frequency resource at the intersection of the row 1105 and the column 1111 by the time and frequency resource at the intersection of the row 1101 and the column 1111. Then, the step S1002 is reiterated.

Therefore, by executing the algorithm of FIG. 10, the processing device initialises the sequence of time and frequency resources with an a priori set of time and frequency resources. Then, the processing device considers time slots one after another and checks whether switching to another time and frequency resource in the considered time slot would provide a better figure of merit, preferably until the figure of merit of the selection of time and frequency resources allows reaching the target QoS.

FIGS. 12A and 12B schematically represent an algorithm for transmitting data between the AP 110 or the AP 111 and at least one communication device, such as the communication device 131, located in at least one respective moving conveyance, according to a third embodiment. In the third embodiment, it is assumed that the selection of time and frequency resources starting at a time slot AITS ("Allocation Initial Time Slot") is performed asynchronously from data packet arrival, in advance with respect to the first time slot in sequence TxITS ("Transmission Initial Time Slot") used for effectively transmitting the packet. Moreover, the selection of time and frequency resources is such that, when a first sequence of N time and frequency resources is defined from a time slot, referred to as AITS hereinbefore, any further second sequence involving a time slot in the range of the AITS+N time slots shall include the corresponding time and frequency resources previously allocated. Hence, the algorithm part of FIG. 12A illustrates how to determine sequences of time and frequency resources and the algorithm part of FIG. 12B illustrates how to effectively transmit the data via the determined sequences.

Referring to FIG. 12A, in a step S1201, the processing device initialises a parameter representing the time slot AITS, i.e. the first time slot in the sequence to determine. Moreover, the processing device initialises a parameter representing all time and frequency resources that are in the time slot AITS or subsequent time slots and that have already been selected.

In a step S1202, the processing device selects from figures of merit the sequence of time and frequency resources, starting from the time slot AITS and including all time and frequency resources that are in the time slot AITS or subsequent time slots and that have previously been selected, based on long-term SINR information, frequency correlation profile and time correlation profile, as already mentioned. For instance, the algorithm of FIG. 9 is executed in order to define the time and frequency resources for the initialisation performed in the step S1202.

In a step S1203, the processing device stores in memory the determined sequence, in association with information representative of the time slot AITS, and also stores, for each time slot in the determined sequence, an information representative of the corresponding allocated time and frequency resource. The number N for the time AITS is an information representative of the corresponding allocated time and frequency resource, as associated with each time slot in the determined sequence, the processing device stores an information representative of the corresponding allocated time and frequency resource. Therefore, when a packet has to be transmitted from the time slot TxITS that matches the time slot AITS for which the sequence has been stored in the step S1203, the packet is transmitted according to the stored sequence. This aspect is detailed hereafter with regard to FIG. 12B. Usually, the processing device selects at least one further time and frequency resource to complement the time and frequency resources remaining from the allocation performed according to previous loops of the algorithm part of FIG. 12A. It however exists some situations in which the time and frequency resources allocated during previous loops of the algorithm part of FIG. 12A are sufficient to reach the target QoS. In such situations, no further time and frequency resources are needed to complement the time and frequency resources already allocated during previous loops of the algorithm part of FIG. 12A.

For instance, four time and frequency resources (N=4) were present in the sequence determined in the previous loop of the algorithm part of FIG. 12A. When switching to a new time slot ALTS, three time and frequency resources remain allocated according to the previous sequence. The processing device then adds one (N=4) or more (e.g. N=5) time and frequency resources in order to be able to reach the target QoS. It means that the number N of time and frequency resources selected to allow the N transmissions supposed to allow reaching the target QoS may be dynamically fixed. A detailed embodiment for selecting the time and frequency resources are detailed hereafter with regard to FIG. 13.

In a step S1204, the processing device moves to the next time slot, which becomes the new time slot AITS from which a new sequence of time and frequency resources needs to be determined, updates the parameter representing the time slot AITS accordingly and repeats the step S1202. When repeating the step S1202, the new sequence at least includes the time and frequency resources, of the previous sequence, which are of the new time slot AITS and subsequent time slots.

Referring now to FIG. 12B, in a step S1211, the processing device checks whether data, i.e. a new data packet, has to be transmitted. When data has to be transmitted, a step S1212 is performed; otherwise, a new loop is performed by repeating the step S1211.

In the step S1212, the processing device retrieves the sequence, as stored in the step S1203, associated with the time slot from which the transmission is expected to start.

In a step S1213, the processing device allows transmitting the data according to the retrieved sequence. Either the processing device is included in the concerned transmitter, and then the processing device internally instructs the transmitter to transmit the data according to the retrieved sequence; or the processing device is connected to the concerned transmitter, and then the processing device transmits a message to the transmitter informing the transmitter about the time and frequency resources to be used to transmit the data. In a particular embodiment, the processing device obtains the number N stored in association with the time slot TxITS in the step S1203, which provides the depth of the sequence and then, for each time slot of the sequence, obtains the allocated time and frequency resource, as also stored in the step S1203.

FIG. 13 schematically represents an algorithm, performed by the processing device, for determining a sequence of time and frequency resources, in the context of the third embodiment.

In a step S1301, the processing device initialises the sequence $R_{tmp}$ of time and frequency resources. The initialised sequence $R_{tmp}$ consists of the time and frequency resources already allocated in previous occurrences of the algorithm of FIG. 13 and that are in the time slot AITS or subsequent time slots. The algorithm of FIG. 13 is detailed hereafter in conjunction with an illustrative example based on FIG. 11. Let's consider that the time slot AITS is the time slot represented by the column 1110, N is initialised to 4 (meaning that, according to the previous occurrence of the algorithm of FIG. 13, N was equal to 5), and that the processing device initialises the sequence $R_{tmp}$ with the time and frequency resource that is at the intersection of the row 1102 and the column 1110, plus the time and frequency resource that is at the intersection of the row 1105 and the column 1111, plus the time and frequency resource that is at the intersection of the row 1103 and the column 1112, plus the time and frequency resource that is at the intersection of the row 1108 and the column 1113. These time and frequency resources result from the previous occurrence of the algorithm of FIG. 13. The processing device also initialises a parameter CTS ("Considered Time Slot'"), which indicates a time slot for which the processing device currently tests the different frequencies that can be allocated in the transmission scheme. The parameter CTS is initialised such that the parameter CTS corresponds to the time slot that is the last allocated in sequence, i.e. the time slot represented by the column 1113 in the illustrative example. Moreover, the processing device initialises the parameter $F_{best}$ at a null value.

In a step S1302, the processing device computes an N×N instantaneous SINR covariance matrix from the sequence $R_{tmp}$ and from channel information, as already explained with regard to FIG. 3. The channel information includes the long-term SINR information, the frequency correlation profile and the time correlation profile.

In a step S1303, the processing device computes the figure of merit for the sequence $R_{tmp}$, on the basis of the instantaneous SINR covariance matrix computed in the step S1302, as already detailed hereinbefore.

In a step S1304, the processing device determines whether the figure of merit computed in the step S1303 is greater than the figure of merit stored by the parameter $F_{best}$. When the figure of merit computed in the step S1303 is greater than the figure of merit stored by the parameter $F_{best}$, a step S1305 is performed; otherwise a step S1306 is performed.

In the step S1305, the processing device stores the sequence $R_{tmp}$ in a parameter $R_{sel}$. The parameter $R_{sel}$ is representative of the best sequence of time and frequency resources determined by the processing device when executing the algorithm. Moreover, the processing device stores the figure of merit, computed in the step S1303, in the parameter $F_{best}$. Then, the step S1306 is performed.

In the step S1306, the processing device checks whether a predefined condition for stopping the execution of the algorithm of FIG. 13 is met. Such a condition is for instance that a timeout, activated when the algorithm of FIG. 13 is launched, has expired, which ensures that the processing time for the algorithm of FIG. 13 does not exceed a constrained time period, e.g. the duration of one time slot. According to another example, the condition is that the figure of merit computed in the step S1303 is greater than the figure of merit corresponding to the target QoS. When the condition for stopping the execution of the algorithm of FIG. 13 is met, a step S1307 is performed; otherwise, a step S1308 is performed.

In the step S1307, the processing device selects the sequence of time and frequency resources identified by the parameter $R_{sel}$ and the algorithm ends.

In the step S1308, the processing device checks whether the last frequency, which can be allocated in the transmission scheme, of the considered time slot CTS has been checked. When the last frequency of the considered time slot CTS has been checked, a step S1311 is performed; otherwise, a step S1309 is performed. When the processing device performs the step S1308 for the first time in the context of the current occurrence of the algorithm of FIG. 13, it means that the processing device has evaluated the figure of merit for the time and frequency resources already allocated and resulting from the immediately preceding occurrence of the algorithm of FIG. 13. In this case, these time and frequency resources cannot be changed and the processing device considers, in the step S1308, that the last frequency of the considered time slot CTS has been checked and the step S1311 is then performed.

In the step S1309, the processing device moves to a next frequency in the considered time slot CTS, i.e. the processing device decides to test, for the time slot CTS, another frequency that can be allocated in the transmission scheme. For instance, with regard to FIG. 11, if the processing device was considering the time and frequency resource at the intersection of the row 1101 and the column 1114, the processing device moves to another time and frequency resource in the column 1114, such as for instance the time and frequency resource at the intersection of the row 1102 and the column 1114. In other words, the processing device is about to consider another frequency in the considered time slot CTS represented by the column 1114. Then, in a step S1310, the processing device updates the sequence $R_{tmp}$ accordingly. According to the example above, the processing device replaces in the sequence $R_{tmp}$ the time and frequency resource at the intersection of the row 1101 and the column 1114 by the time and frequency resource at the intersection of the row 1102 and the column 1114. Then, the step S1302 is reiterated.

In the step S1311, the processing device moves to a next time slot and updates the parameter CTS accordingly. For instance, with regard to FIG. 11, if the processing device was considering the time and frequency resources in the column 1114, the processing device is about to consider the time and frequency resources in the column 1115. The processing device selects one frequency among the frequencies that can be allocated in the transmission scheme. Then, in a step S1313, the processing device updates the sequence $R_{tmp}$ accordingly, by copying the sequence $R_{sel}$ in the sequence $R_{tmp}$ and by adding a time and frequency resource in the new time slot CTS. For instance, the processing device adds to the sequence $R_{tmp}$ the time and frequency resource at the intersection of the row 1101 and the column 1115. Then, the step S1302 is reiterated.

Therefore, by executing the algorithm of FIG. 13, the processing device initialises the sequence of time and frequency resources with a set of time and frequency resources that results from the previous occurrences of the algorithm of FIG. 13. Then, the processing device considers the later time slots one after another and determines which additional time and frequency resource in the considered time slot CTS would provide the best transmission conditions, and this, until reaching the target QoS.

According to a particular embodiment, applicable in any one among the first, second and third embodiments described hereinbefore, the processing device ensures that a frequency is not used more than a percentage P of time during a predefined time period T. A history of an effective use of the frequencies is then kept by the processing device after each allocation of time and frequency resources. Once the percentage P is reached for a given frequency, the corresponding time and frequency resources are no more considered as allocable by the processing device until the effective percentage of usage of said given frequency goes below the percentage P.

According to a particular embodiment, applicable in any one among the first, second and third embodiments described hereinbefore, the processing device applies a weighting function to each long-term SINR value associated with each frequency before the computation of the N×N instantaneous SINR covariance matrix. It allows a more uniform use of among the frequencies that can be allocated in the transmission scheme. For example the weighting function w is defined as follows, and satisfies w(0)=1 and w(1)=0:

$$w(x) = \frac{(\exp(1-x)-1)}{(\exp(1)-1)}$$

In a variant, the weighting function w is defined as follows:

$$w(x) = 1 - x$$

wherein x represents the percentage of effective use of the considered frequency during the predefined time period T.

The invention claimed is:

1. A method for allocating time and frequency resources for at least one data transmission via a fast fading frequency selective channel between an access point of a wireless telecommunications network and at least one communication device located in at least one respective moving conveyance moving on a path, wherein a processing device performs:
   obtaining long-term signal to interference plus noise ratio information for a set of time and frequency resources;
   obtaining at least one frequency correlation profile of the fast fading frequency selective channel;
   obtaining at least one time correlation profile of the fast fading frequency selective channel;
   computing figures of merit for potential sequences of time and frequency resources among the set of time and frequency resources, based on the obtained long-term signal to interference plus noise ratio information, on the obtained frequency correlation profile and on the obtained time correlation profile;
   selecting a sequence of time and frequency resources that provides a figure of merit, among the computed figures of merit, that expects reaching a target quality of service for said data transmission or that is the best figure of merit;
   allowing said data transmission via the selected sequence of time and frequency resources.

2. The method according to claim 1, wherein the processing device performs:

obtaining information representative of at least one position of the respective moving conveyance;

and in that obtaining the frequency correlation profile of the fast fading frequency selective channel consists in obtaining at least one frequency correlation profile respectively corresponding to said position of the moving conveyance.

3. The method according to claim 1, wherein the processing device performs:

obtaining information representative of at least one speed of the respective moving conveyance;

obtaining the time correlation profile on the basis of said speed of the respective moving conveyance and a Doppler frequency shift model.

4. The method according to claim 1, wherein the processing device combines, into one instantaneous signal to interference plus noise ratio covariance matrix for each moving conveyance, the time correlation information, the frequency correlation information and the long-term signal to interference plus noise ratio information.

5. The method according to claim 4, wherein each figure of merit is a result of a function to which the instantaneous signal to interference plus noise ratio covariance matrix is input and which represents an expected probability of success of said data transmission.

6. The method according to claim 4, wherein each figure of merit is a result of a function to which the instantaneous signal to interference plus noise ratio covariance matrix is input and which represents an expected throughput of said data transmission.

7. The method according to claim 5, wherein, for plural moving conveyances, the processing device determines one figure of merit per moving conveyance for each potential sequence of time and frequency resources and associates with each potential sequence the figure of merit being the minimum among the figures of merit determined for the moving conveyances and for said sequence.

8. The method according to claim 1, wherein the processing device performs:

selecting, for each time slot, said sequence of time and frequency resources that provides the figure of merit that expects reaching a target quality of service or that is the best figure or merit;

storing in memory the selected sequence in association with the time slot;

and, when the data transmission becomes effective, the processing device performs:

retrieving from memory the sequence associated with the time slot from which the data transmission becomes effective.

9. The method according to claim 1, wherein the processing device performs:

detecting that the data transmission shall become effective;

selecting, from a time slot from which the data transmission shall become effective, said sequence of time and frequency resources that provides the figure of merit that expects reaching a target quality of service or that is the best figure of merit.

10. The method according to claim 8, wherein, for selecting said sequence of time and frequency resources that provides the figure of merit that expects reaching a target quality of service or that is the best figure of merit, the processing device initialises a first temporary sequence of N time and frequency resources, N being determined to be a priori high enough for reaching the target quality of service, and the processing device further performs the following iterative steps:

computing an instantaneous signal to interference plus noise ratio covariance matrix combining the time correlation information, the frequency correlation information and the long-term signal to interference plus noise ratio information and corresponding to the temporary sequence;

determining a figure of merit for the temporary sequence, on the basis of the computed instantaneous signal to interference plus noise ratio covariance matrix;

determining whether the determined figure of merit is better than a figure of merit corresponding to a second temporary sequence;

replacing the second temporary sequence by the first temporary sequence, when the figure of merit of the first temporary sequence is better than the figure of merit of the second temporary sequence;

selecting the second temporary sequence, when a stopping condition is met;

modifying the temporary sequence by replacing one time and frequency resources and repeating said iterative steps with the modified temporary sequence, when the stopping condition is not met.

11. The method according to claim 8, wherein, for selecting said sequence of time and frequency resources that provides the figure of merit that expects reaching a target quality of service or that is the best figure of merit, the processing device initialises a first temporary sequence of one time and frequency resource, and the processing device further performs the following iterative steps:

computing an instantaneous signal to interference plus noise ratio covariance matrix combining the time correlation information, the frequency correlation information and the long-term signal to interference plus noise ratio information and corresponding to the temporary sequence;

determining a figure of merit for the temporary sequence, on the basis of the computed instantaneous signal to interference plus noise ratio covariance matrix;

determining whether the determined figure of merit is better than a figure of merit corresponding to a second temporary sequence;

replacing the second temporary sequence by the first temporary sequence, when the figure of merit of the first temporary sequence is better than the figure of merit of the second temporary sequence;

selecting the second temporary sequence, when a stopping condition is met;

modifying the first temporary sequence by replacing one time and frequency resource, or, when all frequencies have been checked for a considered time slot of the first temporary sequence, by adding one time and frequency resource in another time slot, and repeating said iterative steps with the modified first temporary sequence, when the stopping condition is not met.

12. The method according to claim 1, wherein the processing device performs:

determining a starting time slot from which the sequence is expected to start;

selecting, for said starting time slot, said sequence of time and frequency resources that provides the figure of merit that expects reaching a target quality of service or that is the best figure or merit, said sequence including time and frequency resources that have been selected in a preceding sequence selection and that are included in said starting time slot or in time slots subsequent to said starting time slot;

storing in memory information representative of the selected sequence in association with said time slot and, with each time slot of the selected sequence, information representative of the time and frequency resource of said time slot which is present in said selected sequence;

and, when the data transmission becomes effective, the processing device performs:

retrieving from memory the information representative of the sequence associated with the time slot from which the data transmission becomes effective and, for each time slot of the retrieved sequence, the information representative of the time and frequency resource.

13. The method according to claim 12, wherein, for selecting said sequence of time and frequency resources that provides the figure of merit that expects reaching a target quality of service or that is the best figure of merit, the processing device initialises a first temporary sequence with said time and frequency resources from the preceding sequence selection, and the processing device further performs the following iterative steps:

computing an instantaneous signal to interference plus noise ratio covariance matrix combining the time correlation information, the frequency correlation information and the long-term signal to interference plus noise ratio information and corresponding to the temporary sequence;

determining a figure of merit for the temporary sequence, on the basis of the instantaneous signal to interference plus noise ratio covariance matrix;

determining whether the determined figure of merit is better than a figure of merit corresponding to a second temporary sequence;

replacing the second temporary sequence by the first temporary sequence, when the figure of merit of the first temporary sequence is better than the figure of merit of the second temporary sequence;

selecting the second temporary sequence, when a stopping condition is met;

modifying the first temporary sequence by replacing one time and frequency resource corresponding to a time slot not present in the preceding sequence selection, or, when all frequencies have been checked for a considered time slot of the first temporary sequence, by adding one time and frequency resource in another time slot, and repeating said iterative steps with the modified first temporary sequence, when the stopping condition is not met.

14. The method according to claim 1, wherein, when selecting a sequence of time and frequency resources, the processing device ensures that a frequency is not allocated more than a predefined percentage of time during a predefined time period.

15. A processing device for allocating time and frequency resources for at least one data transmission via a fast fading frequency selective channel between an access point of a wireless telecommunications network and at least one communication device located in at least one respective moving conveyance moving on a path, wherein the processing device comprises:

means for obtaining long-term signal to interference plus noise ratio information for a set of time and frequency resources;

means for obtaining at least one frequency correlation profile of the fast fading frequency selective channel;

means for obtaining at least one time correlation profile of the fast fading frequency selective channel;

means for computing figures of merit for potential sequences of time and frequency resources among the set of time and frequency resources, based on the obtained long-term signal to interference plus noise ratio information, on the obtained frequency correlation profile and on the obtained time correlation profile;

means for selecting a sequence of time and frequency resources that provides a figure of merit, among the computed figures of merit, that expects reaching a target quality of service for said data transmission or that is the best figure or merit;

means for allowing said data transmission via the selected sequence of time and frequency resources.

* * * * *